(12) United States Patent
Schattenburg et al.

(10) Patent No.: US 10,145,672 B2
(45) Date of Patent: Dec. 4, 2018

(54) DETECTION OF POSITION, ORIENTATION AND SCALE OF WORK PIECES USING RETROREFLECTIVE SURFACES

(71) Applicant: Lithoptek LLC, Summit, NJ (US)

(72) Inventors: Mark Schattenburg, Framingham, MA (US); Rudolf Hendel, Summit, NJ (US); Paul Glenn, Wellesley, MA (US); John Glenn, Carlisle, MA (US)

(73) Assignee: Lithoptek LLC, Summit, NJ (US)

( * ) Notice: Subject to any disclaimer, the term of this patent is extended or adjusted under 35 U.S.C. 154(b) by 0 days.

(21) Appl. No.: 15/414,385

(22) Filed: Jan. 24, 2017

(65) Prior Publication Data

US 2018/0209780 A1 Jul. 26, 2018

(51) Int. Cl.
*G01B 11/00* (2006.01)

(52) U.S. Cl.
CPC .................. *G01B 11/002* (2013.01)

(58) Field of Classification Search
CPC ................................... G01B 11/002
USPC ........................................ 356/620
See application file for complete search history.

(56) References Cited

U.S. PATENT DOCUMENTS

| | | |
|---|---|---|
| 4,955,780 A | 9/1990 | Shimane et al. |
| 5,684,599 A | 11/1997 | Shimoyama et al. |
| 5,850,279 A * | 12/1998 | Nara .................... G03F 7/70275 355/53 |
| 5,980,194 A | 11/1999 | Freerks et al. |
| 6,298,280 B1 | 10/2001 | Bonora et al. |
| 6,405,101 B1 | 6/2002 | Johanson et al. |
| 6,451,408 B1 | 9/2002 | Haunschild et al. |
| 6,481,857 B2 | 11/2002 | Smith |
| 6,677,602 B1 | 1/2004 | Norton |
| 6,817,724 B2 | 11/2004 | Mimura et al. |
| 6,884,371 B2 | 4/2005 | Smith |
| 6,934,661 B2 | 8/2005 | Yuen et al. |
| 6,980,876 B2 | 12/2005 | Lin et al. |
| 7,052,229 B2 | 5/2006 | Berger et al. |
| 7,261,424 B2 | 8/2007 | Smith |
| 9,377,416 B2 | 6/2016 | Maleev et al. |
| 2004/0029028 A1* | 2/2004 | Shimizu ............. G01B 11/0608 430/30 |
| 2005/0012938 A1 | 1/2005 | Chen et al. |
| 2006/0132803 A1* | 6/2006 | Clair .................... G01B 11/002 356/614 |
| 2013/0287536 A1 | 10/2013 | Koelmel |
| 2015/0330914 A1* | 11/2015 | Maleev ............. G01N 21/9503 356/237.5 |
| 2016/0008835 A1 | 1/2016 | Giusti et al. |
| 2016/0209500 A1* | 7/2016 | Markendorf .......... G01S 17/023 |

OTHER PUBLICATIONS

International Search Report and Written Opinion dated Feb. 22, 2018 in International Application No. PCT/US2018/014957.

* cited by examiner

*Primary Examiner* — Michael Stafira
*Assistant Examiner* — Omar Nixon
(74) *Attorney, Agent, or Firm* — Stroock & Stroock & Lavan LLP

(57) ABSTRACT

A method and apparatus in which retroreflective materials and surfaces are used for determining the position, orientation and scale of work pieces in order to accurately place process beams thereon for the purpose of surface patterning or treatment.

34 Claims, 18 Drawing Sheets

DETECTION OF POSITION, ORIENTATION AND SCALE OF WORK PIECES USING RETROREFLECTIVE SURFACES

TECHNICAL FIELD

The present invention relates generally to the use of retroreflective surfaces for determining the position, orientation and scale of work pieces in order to accurately place process beams thereon for the purpose of surface patterning or treatment, and to do so with high speed and accuracy. In addition, accurate and known positions of retroreflective features or fiducials on work pieces or test articles can be used for the correction of beam deflection linearity of scanning devices to enable accurate location of a process beam on a work piece. In one embodiment described herein, this invention can be applied to semiconductor wafer processing equipment where it can be used to detect wafer position, orientation and beam deflection scale and linearity.

BACKGROUND

Retroreflective materials and surfaces are widely used to promote safety in traffic signs and high visibility clothing. Utilizing the property of retroreflective materials to reflect incident light generally back to the direction from whence it came, this effect results in highly visible features when viewed from objects with light sources, such as the headlights of cars. Retroreflection (sometimes called retroflection) is typically used on road surfaces, road signs, vehicles, and clothing. For example, when the headlights of an automobile illuminate a retroreflective surface, the reflected light is generally directed back towards the car and driver, rather than in all directions as with diffuse reflection or scattering.

The contrast between the return signal of a retroreflective surface and an adjacent area which does not retroreflect is high and readily detected. Therefore, scanning a beam across the edge of an object which itself does not retroreflect, in juxtaposition with a retroreflective surface either adjacent or in the background, gives a strongly differentiated signal which allows the location of the edge to be determined with high accuracy. As described herein, this effect is used to accurately locate the position of edges and other specific features of objects (such as a notch) which are critical in determining the object's orientation. The use of fiducials on work pieces or test articles can be used for a variety of metrology purposes to be described. In one embodiment, the present invention accurately determines the location of wafer edges in semiconductor processing, as well as, for example, the location of the wafer center and the orientation of the wafer notch. The knowledge of these parameters is important for many processes.

In many industrial processes, as for example in semiconductor wafer processing, a beam of energy, such as a laser, electron, or ion beam, is scanned over a work piece in order to deposit energy of a particular character. Such an energy beam can also be called a process beam. For example, in semiconductor wafer processing, a beam of actinic radiation, such as a ultra-violet, deep ultraviolet, or extreme ultra-violet radiation (UV, DUV or EUV), or a beam of electrons or ions, may be scanned across a substrate for the purpose of energy deposition. In other cases, a visible or infra-red (IR) beam may be scanned across the substrate. The energy deposited by the beam may be controlled point by point as the beam scans, in order to deposit a particular energy pattern, or a so-called dose map (for example, in units of milli-Joules per square centimeter—$mJ/cm^2$). The deposited energy may be imparted for many reasons, for example to chemically modify the surface or heat the surface for many purposes including annealing or promoting chemical reactions.

Many methods of scanning a process beam over a work piece are known in the art. For example, mirrors or prisms affixed to mechanically scanning or rotating stages may be used to sweep the beam across the substrate. Specifically, a two-axis galvanometer stage with affixed beam deflection mirrors may be used to scan a beam across a substrate. By slowly scanning one mirror (to be named a Y axis mirror in this example), whilst quickly scanning a second mirror orthogonal to the first (to be named an X axis mirror in this example), the entire substrate may be scanned and treated. Other beam deflection methods are also well known, including electrostatic or magnetic deflectors for charge particle beams, electro-optic or acousto-optic beam deflectors for light beams, and micro-mechanical beam deflectors and steering devices for light beams.

In many such devices for actuating beam steering and scanning, the desired amount of beam deflection is controlled by an input signal such as an analog or digital voltage. For scanning mirror galvanometer devices, for example, the angle of beam deflection from the mirror is controlled by an input voltage. The positional accuracy of energy dose imparted to the work piece surface by the beam is controlled by two factors as the beam scans: (1) the ability to place the beam at the correct position on the work piece at the correct time, and (2) the ability to actuate or control the intensity or power of the process beam to the correct level for that beam position, commensurate with the desired dose map. Many methods of controlling process beam intensity or power as a function of time are well known in the art. For example, for light beams, acousto-optic or electro-optic shutters may be employed to precisely control beam energy, synchronized with beam deflection.

However, a problem exists when using an input signal to accurately control the position of a scanning beam on a work piece. For example, an input voltage signal which is intended to deflect a process beam to a particular portion on the work piece may become distorted by signal amplifiers and cause the beam to impinge on the work piece with a positional error. In addition, the deflection voltage signal, when received by the beam deflection servo electronics, may not deflect the beam to the desired angle due to non-linearity or drift of the deflection electronics and/or mechanics. In addition, the beam, as deflected to a particular angle, may not land on the work piece at the desired location due to distortion imparted by intervening optical components such as mirrors or lenses. In addition, the beam, when landing on the work piece at a particular location, may not be correctly registered to the work piece due the work piece having been shifted from its desired location or orientated improperly. In addition, the beam, when landing on the work piece at a particular location, may not have the desired X and Y axis scale factors due to the work piece being placed at the incorrect position along the optical path of the beam deflection system or other factors.

When performing scanning beam energy deposition, in some cases a uniform energy deposition may be desired. In other cases an identical energy deposition map or pattern may be desired for all work pieces. In still other cases it may be desired to change the deposition map for each work piece to follow some industrial process. Finally, it may be desired to change the deposition map for each work piece by pre-correcting the deposition map for known systematic errors of a subsequent or antecedent industrial process step. Generally, however, it is critical to achieve accurate registration of the imparted energy map or pattern on the work piece, and to accurately control the amount of energy deposited at each location on the work piece. For example, for the case of semiconductor manufacturing, it may be desired to control the accuracy of beam position on the substrate to better than 1 mm, 100 microns, 10 microns or even less.

For many applications, it may be difficult to accurately ascertain the position of the process beam with respect to the work piece surface, for example due to the nature of the environment or of the beam itself. In some cases, for example, the work piece may be processed in a chamber which is inconvenient or hostile to typical kinds of sensors such as industrial cameras. In other cases, the nature of the process beam itself, for example a high power UV laser beam, may return very little useful signal to a camera as it traverses the work piece. In other cases, exposure of the work piece to the energy beam, for example, for the purpose of determining the work piece position, may impart energy to the surface which may not be desired.

In order to avoid these limitations, a probe beam may be used in conjunction with the process beam for the purpose of probing work piece boundaries, and other fiducials as taught herein, for the purpose of determining the work piece location and orientation without causing undesired energy deposition. In this case it is important that the probe beam not have the same effect on the work piece as desired by the process beam, or at least have a very small effect, so that the action of probing the work piece with the probe beam will not compromise the desired energy deposition accuracy of the process beam. For example, in many cases when using a high power UV or DUV process beam, a low power red or infrared (IR) laser, for example a helium-ion laser or diode laser, can safely be used as a probe beam.

In order for the probe beam to be able to accurately determine the position and orientation of the work piece with respect to the process beam, the probe beam must in effect act as an accurate surrogate for the process beam. In other words, as the process beam traverses the work piece in response to a deflection input signal, the probe beam should be able to also traverse the work piece at exactly the same position as the process beam in response the same deflection input signal, or at least with a known and stable offset with respect to the process beam. Described herein are means for achieving this requirement.

In a further embodiment of the present invention, an exposure field can be mapped by the probe beam with high accuracy to determine scale linearity factors. The factors are measured by incorporating fiducials on work pieces or test articles containing retroreflective features at precisely known locations within the processing plane. These measured factors can then be converted into beam deflection corrections which can be incorporated by the beam positioning means to reduce beam positioning error. These corrections can be implemented, for example, by appropriate electronics, controls and/or software.

The comparison of intended beam positions with probed beam positions results in a mapping of scan errors for each position probed. The information gathered by this process allows accurate determination of the coordinate reference frame of the probe beam, which can then be used to provide accurate positioning of either probe or process beam on the process surface of interest (such as the surface of a semiconductor wafer).

The relative motion of the probe or process beam over the work piece can be achieved in a number of ways. For example, the beam may be scanned using galvanometers, rotating prisms or deflections using acousto-optic or electro-optic devices. Alternatively, the beam may be stationary and the object may be moved, for example with a stage. What is important is a relative motion of the beam with respect to the object and fiducials affixed thereto, such as edges or notches.

Methods and apparatuses for performing measurements capable of determining the accurate position and orientation of a substrate with respect to a process beam are described herein. Further, methods and apparatuses for performing measurements capable of determining, with high accuracy, distortions of the coordinate reference frame of the beam deflection system with respect to the objects to be processed are also disclosed. Still further, methods and apparatuses wherein said distortion maps can be used to correct the beam deflection system by use of hardware and software means in order to substantially improve the linearity of beam deflection and scanning across the object, thereby achieving superior process beam energy deposition accuracy on the work piece, are also disclosed.

Retroflectors

Retroreflectors are devices that operate by returning light back to a source along the same general direction from hence the light came. FIG. 1 illustrates the basic principle of four types of surfaces to incident light beams. A reflective surface 101, also called a mirror or specular surface, returns beam 101a incident onto surface 101c in the form of beam 101b along a direction with an identical angle of incidence as the incoming beam, but of opposite sign. A diffuse surface 102 returns beam 102a incident onto surface 102c in the form of a plurality of beams 102b along a wide range of directions. A retroreflective surface 103 returns a beam 103a incident onto surface 103c in the form of beam 103b along a direction with an identical angle of incidence as the incoming beam. A diffuse retroreflective surface 104 returns a beam 104a incident onto surface 104c in the form of a plurality of beams 104b along a direction within a narrow range of angles arranged around the angle of incidence of the incoming beam.

The efficiency of retroreflectors is described by a coefficient of luminous intensity (RI), which is the measure of reflector performance, defined as the ratio of the strength of the returned light (luminous intensity) with respect to the amount of light impinging on the retroreflector (normal illuminance). For high signal-to-noise values, it is desirable to have high luminous intensity.

Two types of retroreflectors are commonly used: sphere (or cat's eye) and prism (or corner cube). These are commercially available as single devices, which can be mm or cm in size or even larger, or in sheet form utilizing many small retroreflector devices each of sub-mm size. FIG. 2 illustrates the principle of sphere and prism retroreflectors. Sphere retroreflector 200 is shown with a light ray 200a incident onto sphere 200c refracting through the sphere's front surface and reflecting from the back surface (the so-called cat's eye effect) forming return ray 200b which returns generally in the direction of the incident ray. Prism retroreflector 201 is shown with a light ray 201a incident onto inverted prism 201c reflecting from three of the prism's surfaces and forming return ray 201b which returns generally in the direction of the incident ray. (In the figure, only two reflections are depicted in the interest of simplicity.)

Retroreflector devices can also be produced in sheet form and are called microbead or microprismatic surface retroreflectors. Generally speaking, corner reflectors are better at sending the light back precisely to the source over long distances (retroreflector surface), while spheres are better at sending the light to a receiver which may be positioned somewhat off-axis from the source (diffuse retroreflector surface). Microprismatic retroreflectors and microbead retroreflectors in sheet form are commercially available. Microbead reflectors can be commercially obtained in relatively large sheets that may be useful for the applications described herein. Microprismatic reflectors, whilst typically the most efficient types with high RI, generally have only small regions (in the order of few mm) of undisturbed retroreflective areas, separated by borders which do not retroreflect. These periodic borders do not impact their use in commercial applications such as traffic safety, but may not be preferred for the applications described herein.

FIG. 3 illustrates the principle of so-called microbead or microprism retroreflectors surfaces. Microbead retroreflectors 300 generally utilize a bed of microscopic glass or plastic beads 300c bonded to a reflective substrate 300d. Light rays 300a incident on an individual bead refract through the bead's front surface and reflect from the bead's back surface (the so-called cat's eye effect) forming return ray 300b which returns generally in the direction of the incident ray. Microprism retroreflectors 301 utilize a bed of microscopic plastic, glass or metal inverted pyramids 301c formed onto a substrate 301d. Rays 301a incident on an individual pyramid reflect thrice from the prism's surfaces forming return ray 301b which returns generally in the direction of the incident ray. A history of commercial applications for retroreflectivity can be found at: http://reflectivetape.info/502-2/

Position Detection of Work Piece Edges

Determining the Position of Objects

Many manufacturing processes determine the position, shape and scale of objects using machine vision, a method combining automated image analysis with other methods and technologies to provide automated inspection and robot guidance in industrial applications. Object edges can be determined using high resolution cameras and subsequent vision analysis.

Alternatively, a boundary, edge or other feature of an object can be determined by the object intercepting a probe beam between source and detector as shown in FIG. 4. See U.S. Pat. No. 5,684,599, FIG. 2. Traditional methods of wafer edge and notch detection used by semiconductor manufacturing equipment frequently use this approach, wherein the wafer is placed on a stage and rotated and/or translated beneath the probe beam as described below.

Detecting the Position and Orientation of Wafers in Semiconductor Manufacturing

In semiconductor processing, the position and orientation of a wafer within a process chamber is frequently required to be precisely determined. In the current art, this is frequently achieved by positioning a wafer on a rotating stage with a probe light beam on one side of the wafer surface and a detector on the other side.

Rotating the wafer causes a signal indicating the position of the wafer notch, as taught by Shigetoshi Simoyama et al. (U.S. Pat. No. 5,684,599) and Adam E. Norton (U.S. Pat. No. 6,655,602 B1). In FIG. 4, a stationary beam 12 is emitted by light emitting unit 6 and detected by photodetecting unit 8, whilst being partially blocked by substrate W. As substrate W is rotated by spindle 4 and motor 16, or moved laterally by a stage (not shown), moving as shown between beam source 6 and detector 8 in wafer edge detecting means 10, the position of the wafer edge, or wafer feature such as a notch, is detected when the transmitted probe beam changes between ON and OFF states, generating a corresponding signal on detector 8. The orientation of a critical object feature (such as a notch or corner) is signaled by a change in signal amplitude, as more light is transmitted when the feature is passing between source 6 and detector 8 compared to the condition when there is no feature present.

The rotation of the wafer is a mechanical process, requiring the wafer to be accelerated, moved at constant velocity, and stopped with the angular position being tracked. This process may take several seconds. In addition, the wafer center position is known only to the accuracy with which a placement robot has positioned the wafer on the rotating chuck. An error in placement position can interfere with the wafer notch signal and reduce signal/noise of the measurement, reducing measurement accuracy. This can be eliminated by allowing an adjustment of the wafer center through an X/Y linear motion, however, this further complicates the mechanical positioning process and adds overhead time.

It is therefore desirable to detect wafer position and wafer orientation by optical rather than mechanical means.

For the case of processing a wafer using a scanning or projected process beam, however, traditional methods of substrate boundary detection pose an additional difficulty. For example, for the case of camera detection of substrate edges as described previously, the substrate boundary location is identified with respect to the location of pixels within the camera's imaging plane, and not with respect to the process beam. Distortions in the camera optical system and uncertainties of the location of the camera with respect to the substrate, for example, will generate uncertainties in the position of the probe beam with respect to the substrate boundary. In another example, the case of fixed probe beam detection of substrate edges as described previously and shown in FIG. 4, the substrate boundary location is identified with respect to the location of the probe beam, and not with respect to the process beam. Uncertainties in the probe beam's direction and uncertainties of the location of the probe beam and detector with respect to the substrate, for example, will generate uncertainties in the position of the process beam with respect to the substrate boundary.

It is therefore desirable to detect wafer position and wafer orientation by optical means which utilize a probe beam co-propagating with the process beam.

An entirely optical edge detection process, using traditional means without mechanical rotation or translation of the wafer, would require a large number of sensors closely spaced around the wafer circumference. For example, if the wafer edge or the wafer notch were to be determined to approximately 0.3 mm, the sensors would have to be capable of differentiating a distance of ~0.1 mm, and thus would have to be spaced that closely. This is both difficult and expensive to perform when using available sensors, and therefore moving the feature of interest (such as rotating the wafer) in front of a single sensor, or detecting the feature with a high resolution camera, has been preferred to determine these parameters of interest with sufficient accuracy.

SUMMARY

The present invention provides a solution to the foregoing problems by, in certain embodiments, positioning a retroreflective surface behind or adjacent to the object's feature of interest and preferably surrounding all object edges. The retroreflective surface causes the probe (or measurement) beam to be reflected back from any position outside the boundary of the object of interest and without limitation in tangential resolution. For the case that the retroreflective surface is placed behind the object, the distance of the retroreflective surface to the object edge is not important and the reflection observed appears to originate from a location in the object plane without requiring further geometric corrections. The high contrast in the returned signal from the object surface, compared to the signal from the retroreflector surface, allows clear distinction of the edges, even if the object has a strong specular reflection, as the reflected beam is not returned along the incident probe beam (see 101 of FIG. 1). If the retroreflective material is contiguous, the precision of the edge position is determined by the size of the probe beam and the resolution of the beam positioning device.

Embodiments of the invention disclosed herein teach optical apparatuses and methods using a retroreflective surface or surfaces to accurately locate the position and orientation of object fiducials, such as object edges, centers, corners, notches and geometric artifacts, by placing the object to be measured between a detector and a retroreflective surface, or alternatively, adjacent to a retroreflector surface, and scanning the border of the object with a probe beam and sensing the reflection from the retroreflective surface.

Further, as described herein, a probe beam may be precisely co-aligned and scanned with a process beam and the relative displacement of the probe beam with respect to the process beam accurately measured.

Still further, apparatuses and methods are described that accurately determine feature (fiducial) locations in the plane of a substrate or substrate surrogate by positioning retroreflective markers at well-known locations in the process plane and locating the position of those locations by detecting the signal reflected from the retroreflective surface within these markers on the substrate. The measured displacement of the fiducial markers from their known positions allows accurate determination of beam deflection errors, which can be used to correct beam deflection electronics and controls to achieve improved process beam placement accuracy on the object.

In this disclosure the terms "work piece," "object," "product," "wafer," "substrate," "surrogate," or "test article" are generally synonymous and refer to a surface undergoing laser processing or metrology. Also in this disclosure the phrase "fiducial" generally refers to any well-defined geometric artifact or feature of an object that may be used to help position, scale, or orient the object in space with respect to a beam.

DETAILED DESCRIPTION OF EMBODIMENTS

Figure 1:
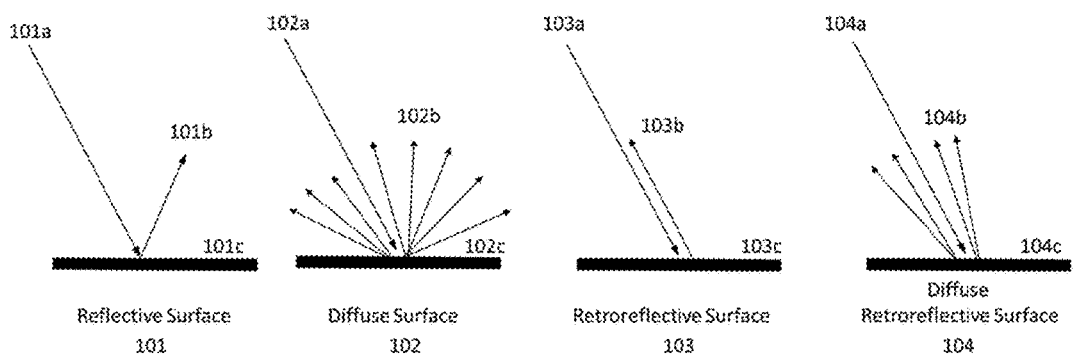
FIG. 1 depicts types of light reflection and scattering from different surfaces.
Figure 2:
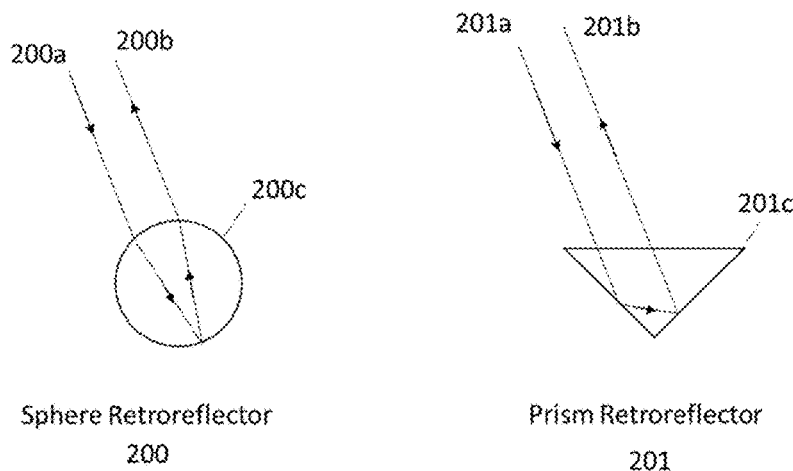
FIG. 2 shows two types of structures which exhibit retroreflective behavior: spherical and prismatic.
Figure 3:
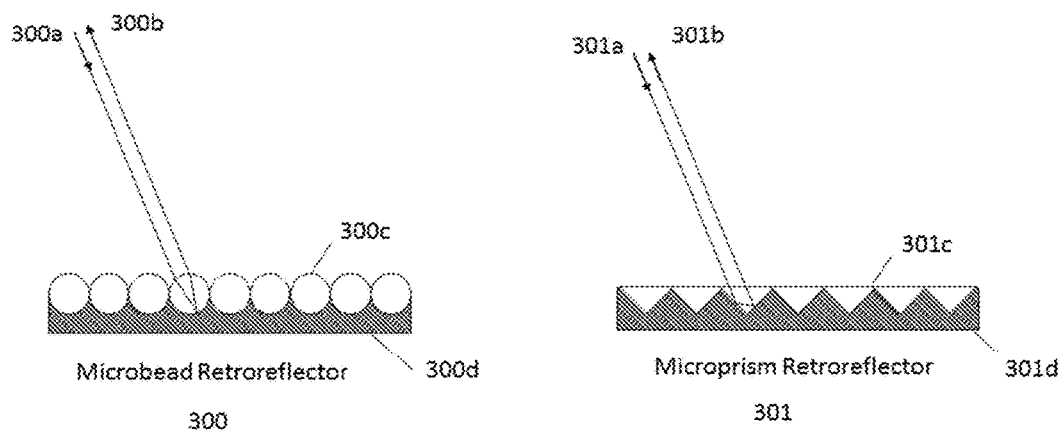
FIG. 3 shows details of two types of retroreflective surfaces: microbead and microprism.
Figure 4:
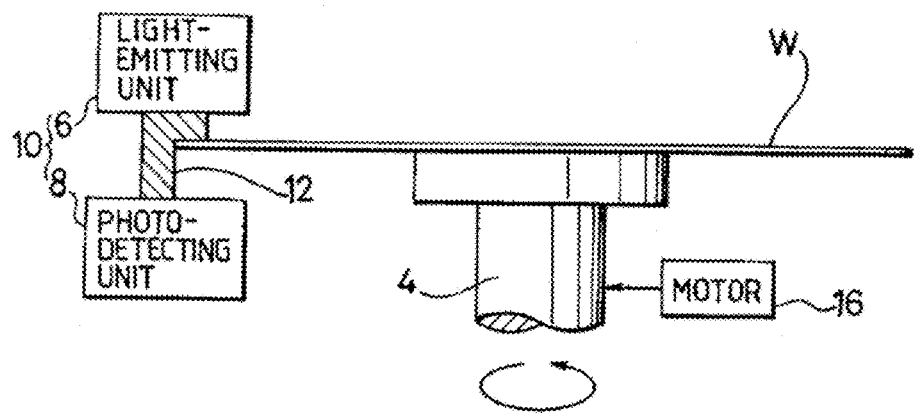
FIG. 4 shows a representation of a prior art method for the detection of wafer edge and wafer notch in semiconductor manufacturing applications. The method utilizes a detector and a beam of light that is occulted by a wafer edge or notch as the wafer is moved.

Methods and apparatuses described herein can accurately detect a border between a normally reflecting object (either diffuse or specular) and a retroreflective area. The contrast in the signal detected from the returned beam is used to determine the location of the object's edge. In certain embodiments the retroreflective surface surrounds the object or is placed behind the object such that the probe beam illuminates the retroreflective surface as soon as it leaves the object area.

While the description herein uses the term "beam deflection," assuming that the beam is being moved and the object is stationary, what is essential is a relative motion of the probe beam in reference to the object edge and the retroreflective material. This can be achieved in a number of ways such as moving the object relative to the beam or any number of means for deflecting beams. Selecting one of those methods in the description here is not intended to limit the scope of this invention to exclude all of the other methods of relative beam positioning.

For the subsequent discussion, the situation is described where the probe beam is scanned across the object using galvanometers. This description in no way limits the invention to this relative motion only, and other methods of relative motion should be included in this approach.

The probe beam is moved relative to the object edge or feature and the reflected intensity is measured using a detector capable of measuring light intensity at the wavelength of the probe beam. A large number of detectors (such as photo diodes) are available commercially satisfying those requirements.

The probe beam may be co-aligned to a process beam which may operate at a different wavelength than the probe beam. Beam processes frequently require wavelengths outside of the visible spectrum such as in the infra-red (IR) or ultra-violet (UV) or deep ultra-violet (DUV). The wavelength and intensity of process beams is dictated by the application.

Co-aligning probe beams and process beams can be performed with good accuracy using conventional methods. An example of a method to co-align a probe and a process beam is described in conjunction with FIG. 5. Once co-aligned, the process beam and probe beam illuminate the object at the same position, or at a known position offset relative to each other. Once co-aligned, the probe beam alone can be used to further determine the target locations of the process beam. The probe beam and process beam can be on at the same time, or alternating between them. It is preferred to use a probe beam of benign properties, for example of wavelength or power level such that the probe beam does not cause undesired alteration of the work piece or work piece surface. After locating the object's boundaries with a probe beam, the desired substrate surface processing or alteration can then be accurately performed by the process beam.

For the case that the detected boundaries, orientation and/or scale of a work piece is incorrectly disposed with respect to a planned scan pattern of a process beam, several remedies may be applied. For example, for the case that the work piece was imprecisely loaded into a scan process location, a request may be made by the scan control system to a robot or human loader to reposition the work piece. Alternatively, the scan control system may recalculate the planned scan pattern to correct for the incorrect position, orientation and/or scale of the work piece, as known in the art.

Once the accurate position of the probe beam is known using the apparatus and methods described in this disclosure, the accurate position of the process beam is also known over the entire exposure field.

The wavelength of the probe beam is typically selected to be in the visible portion of the spectrum, and most typically in the red, as high quality red beams (such as a from a helium-neon or diode laser) are readily available. In some embodiments, work piece edges are juxtaposed in front, or adjacent to, a retroreflective material. The position of these edges can then be accurately determined within the scan field parameters of the probe beam.

If the wavelength and intensity of the process beam is such that it may damage the retroreflective material, a protective cover which is transparent to the probe wavelength, but blocks the process wavelength, can be placed on top of the retroreflective material. This prevents the retroreflective material from being damaged, but still allows the retroreflective signal to be detected.

Figure 5:
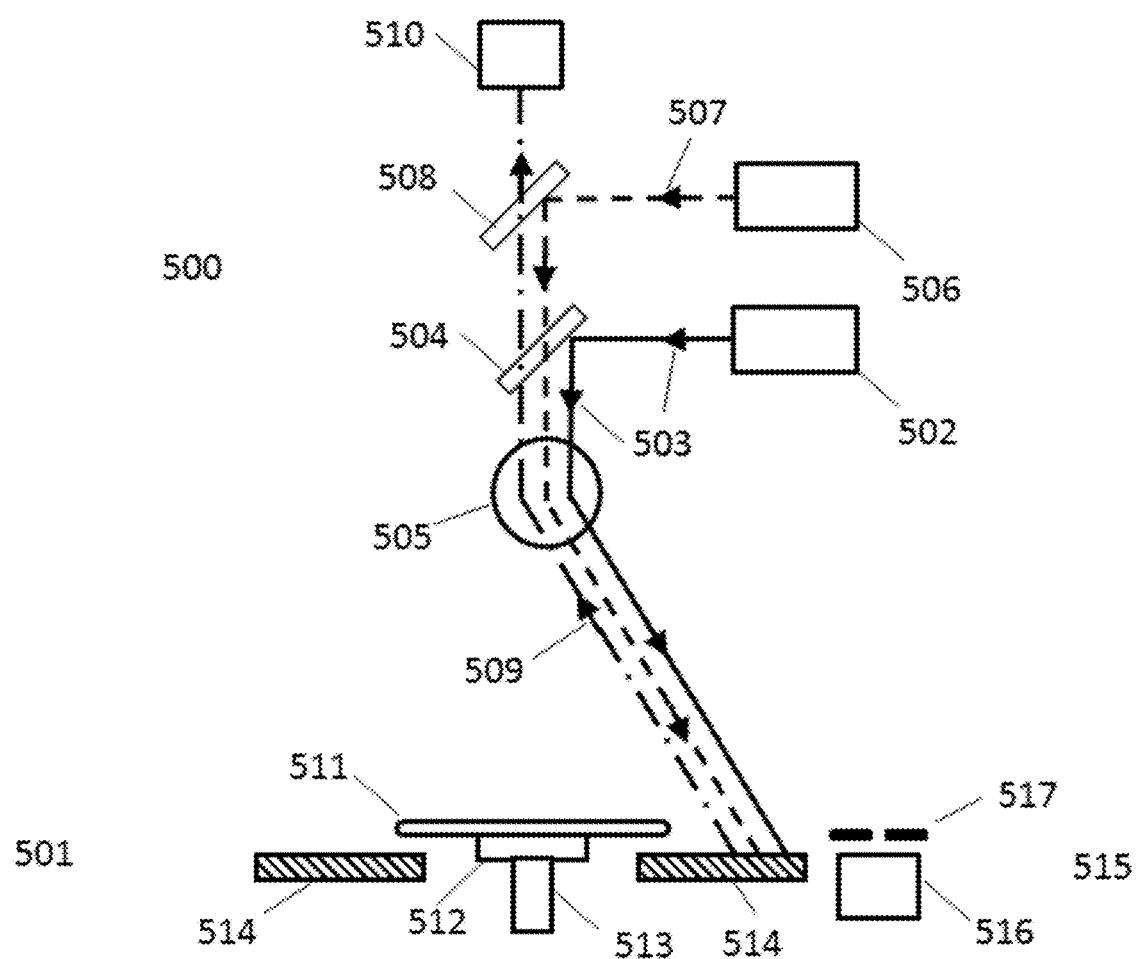
FIG. 5 shows one embodiment of the invention with a probe beam co-aligned with a process beam and both beams deflected towards a work piece using a deflection mechanism.

A cross section of a schematic for an apparatus in accordance with one embodiment of the invention is shown in FIG. 5. The apparatus is comprised of two sections: a beam control section 500 and a substrate control section 501. In beam control section 500 is disposed a process beam generating unit 502, for example a laser, which produces a process beam intended for substrate processing. Process beam generation unit 502 produces process beam 503 which reflects from beam splitter 504 and is deflected by beam steering device 505, for example a two-axis galvanometer beam scanning unit. Process beam 503 is then steered towards substrate control section 501.

Also disposed in beam control section 500 is probe beam generation unit 506, for example a diode laser, which produces a probe beam intended for substrate position metrology. Probe beam generation unit 506 produces probe beam 507 which reflects from beam splitter 508, transmits through beam splitter 504 and is deflected by beam steering device 505. Probe beam 507 is then steered towards substrate control section 501 in alignment with process beam 503.

Also disposed in beam control section 500 is retroreflected beam signal detector 510, for example a photodiode. Retroreflected beam 509 returning from substrate control unit 501 is deflected by beam steering device 505, transmits through beam splitters 504 and 508, and impinges on retroreflected beam signal detector 510.

For the purpose of illustration, in FIG. 5 process beam 503 and probe beam 507 are depicted as slightly displaced in space. In practice it would be preferred to orient them so that they are closely co-aligned so as to be nearly superimposed. For example, beam splitters 508 and 504 may be equipped with manual or actuated tilt controls which many be used to change the angle and displacement of each beam. Such so-called tilt-tip optical mounts are available from many vendors. Those skilled in the art would be able to co-align the beams using this method with the aid of an alignment target, for example a fluorescent screen.

In substrate control section 501 is disposed substrate 511, for example a silicon wafer, which is mechanically affixed to substrate holder 512, and motion control device 513, for example a wafer chuck and motorized spindle. Disposed under and around the periphery of substrate 511 is retroreflector 514. Also in substrate control section 501 is disposed beam position sensor 515. Beam position sensor 515, described further below, includes photodetector 516 and pinhole 517.

The various components of beam control section 500, substrate control section 501 and beam position sensor 515 will now be discussed with reference to FIGS. 6 through 11.

Figure 6A:
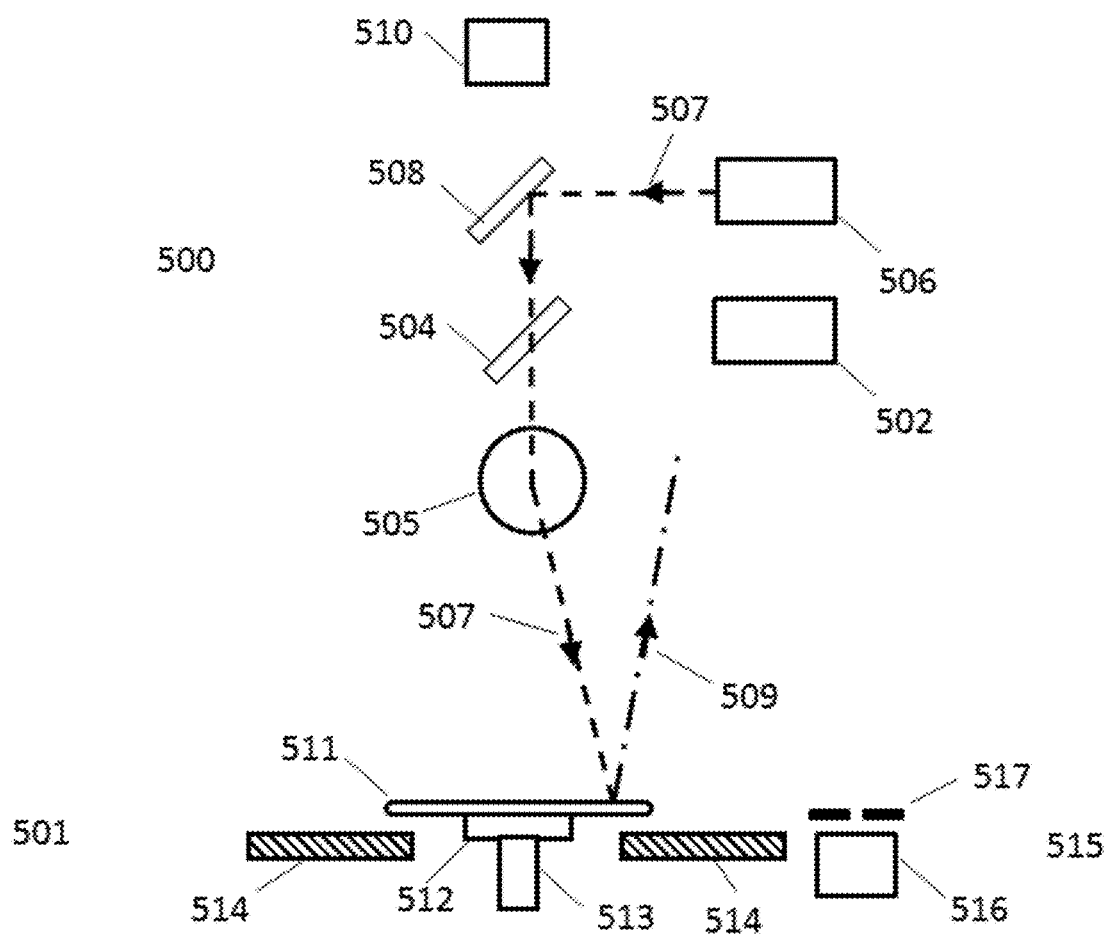
FIG. 6a shows the apparatus of FIG. 5 where a probe beam is being swept across a substrate which is surrounded by a retroreflective surface that is behind the substrate.
Figure 6B:
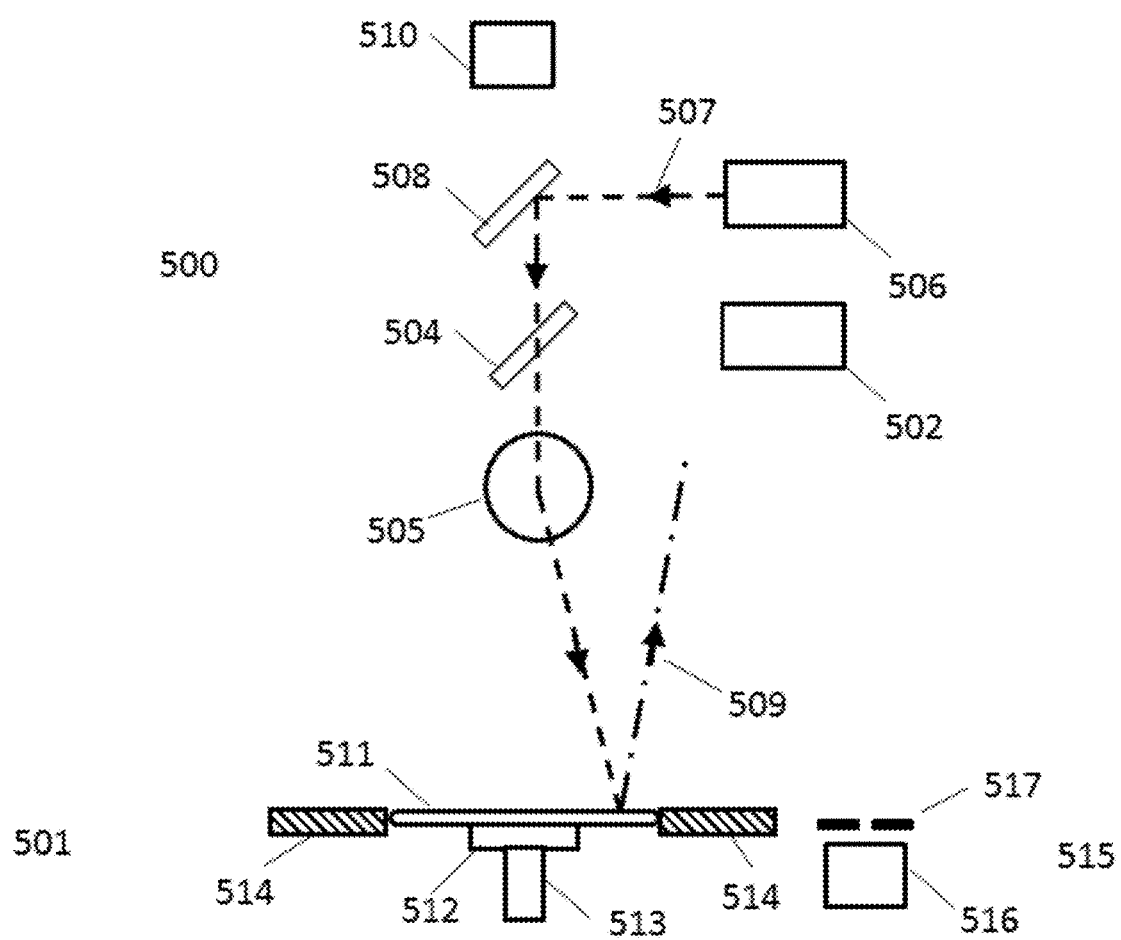
FIG. 6b shows an alternative embodiment of the apparatus of FIG. 6a where a probe beam is being swept across a substrate which is surrounded by a retroreflective surface that is adjacent the substrate.

With reference to FIG. 6a, the apparatus of FIG. 5 is shown but with the beam control section 500 configured for substrate probing such that only probe beam 507 is energized whilst process beam 503 is turned off. Probe beam 507 is in the process of sweeping across substrate 511 from left to right by beam steering device 505. While probe beam 507 traverses the surface of substrate 511 as shown, only specular reflection 509 results and no signal is returned to detector 510. FIG. 6b depicts an alternative embodiment where the retroreflective surface 514 is adjacent to substrate 511 rather than behind substrate 511 as shown in FIG. 6a.

Figure 7A:
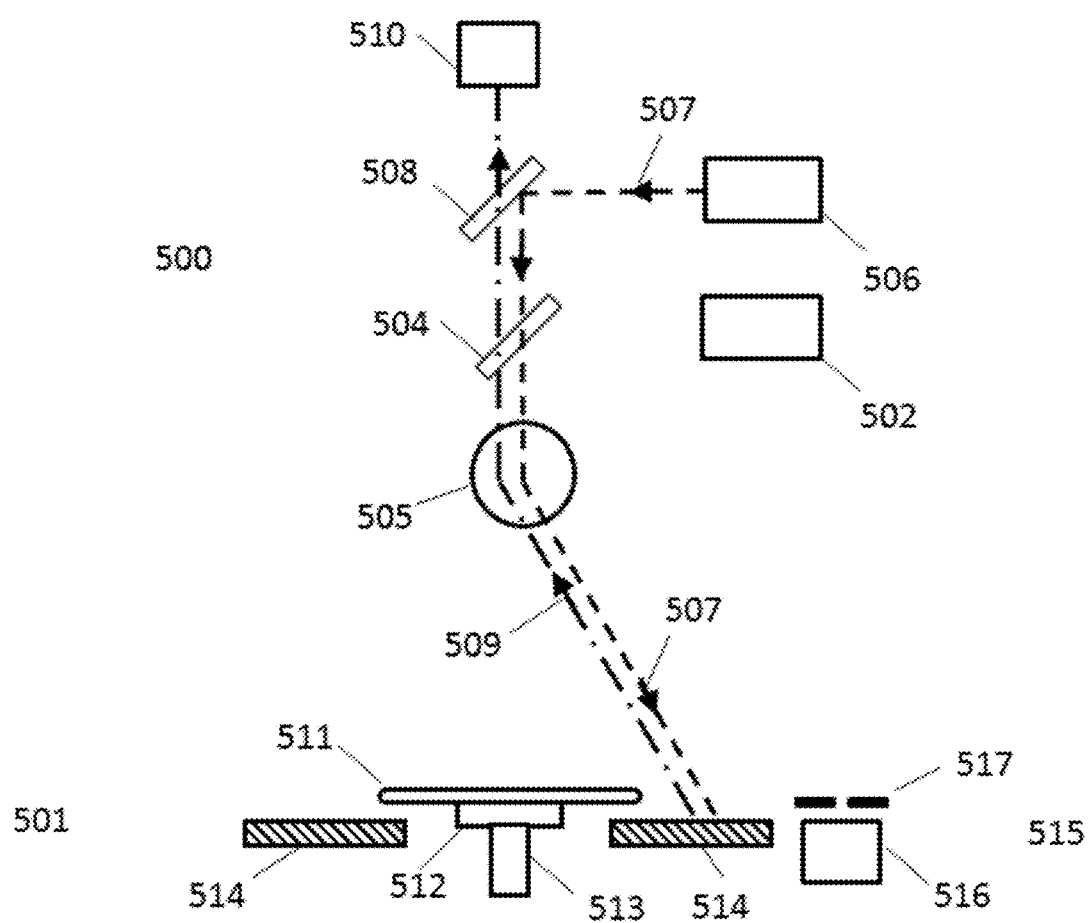
FIG. 7a shows the apparatus of FIG. 6a showing the probe beam at a later time where it is positioned on the retroreflective surface.

FIG. 7a shows probe beam 507 of FIG. 6a at a later time during the sweep where it has traversed the substrate edge and is now substantially positioned on retroreflector 514. In this case probe beam 507 is returned from retroreflector 514 to detector 510 as retroreflected beam 509.

Figure 7B:
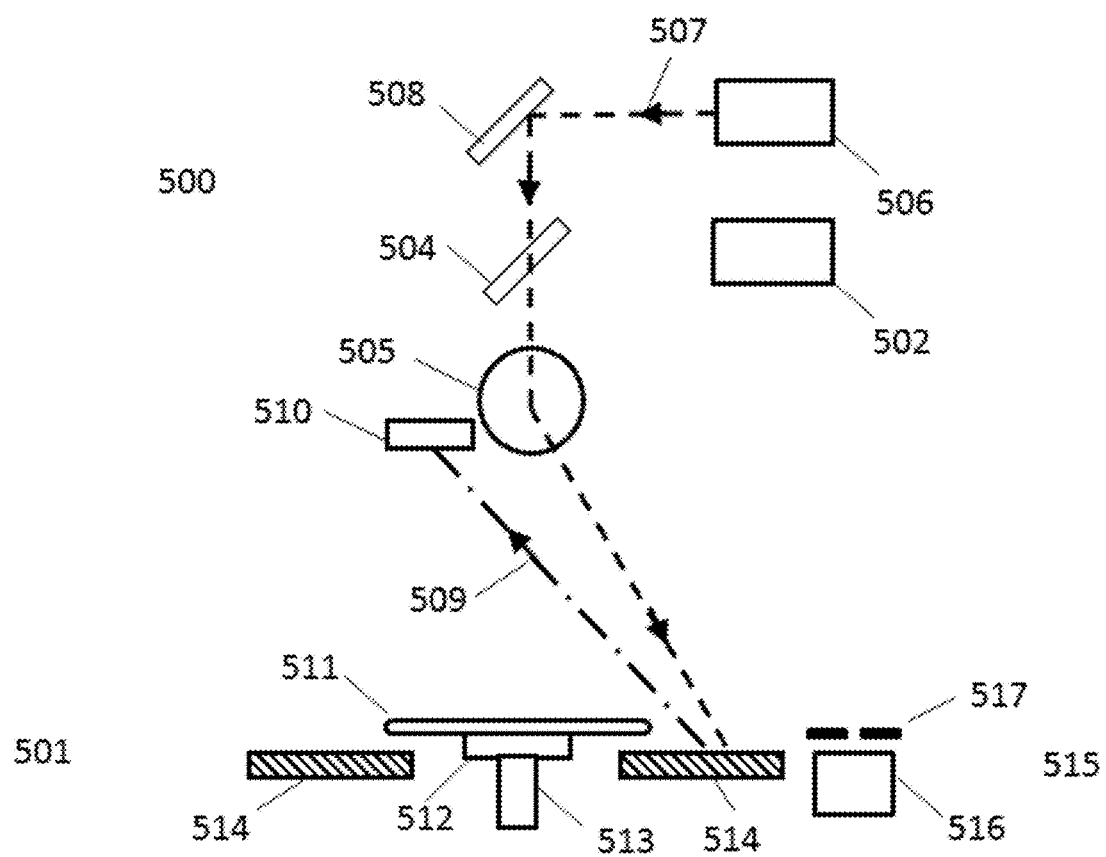
FIG. 7b shows an alternative embodiment of the apparatus of FIG. 7a utilizing an alternative location for the retroreflected beam detector.

FIG. 7b depicts an alternative embodiment where detector 510 is disposed next to beam steering device 505. For the case of FIG. 7a, retroreflector 514 may be of the retroreflective or diffuse retroreflective types as depicted in FIG. 1, whereas for the case of FIG. 7b it is preferred that retroreflector 514 be of the diffuse retroreflective type.

Figure 8A:
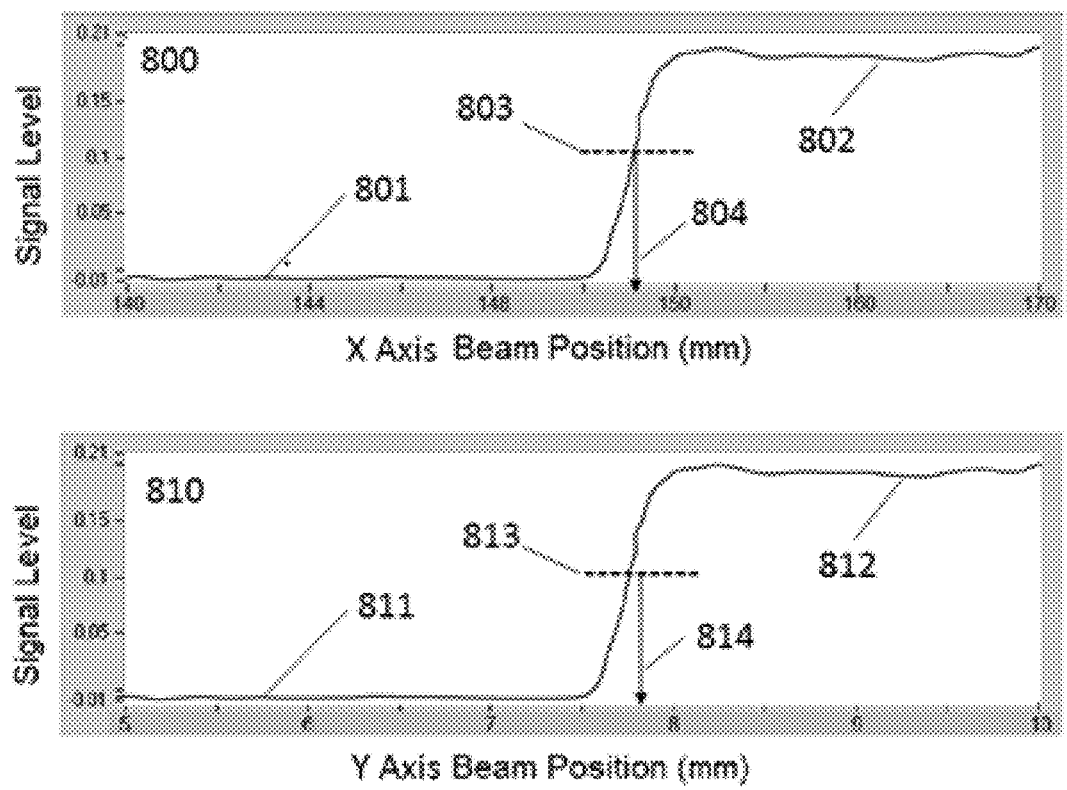
FIG. 8a shows a representative signal obtained by a retroreflector detector when a probe beam is scanned across the edge of an object, said signal displayed for motion along both the X and Y axes.

FIG. 8a shows a representative signal from detector 510 obtained during the sweep depicted in FIGS. 6 and 7, plotted vs. the commanded position sent to deflector 505. Plot 800 shows the signal from detector 510 vs. the commanded X-axis beam position of deflector 505. Plot 810 shows the signal from detector 510 vs. the commanded Y-axis beam position of deflector 510. In region 801 of plot 800 and region 811 of plot 810 the detector signal is low indicating that the beam is substantially on substrate 511.

With reference to FIG. 8a, in region 802 of plot 800 and region 812 of plot 810 the signal from detector 510 is high indicating the probe beam position is substantially on retroreflector 514. Plots 800 and 810 demonstrate that as the beam moves across a substrate edge, the signal on detector 510 makes a transition from low to high level. The gradual transition of the signal from low to high is due to the finite size of the probe beam. This transition can be used to determine the location of the substrate edge in [X, Y] scan coordinates as follows.

Plot 800 (X axis position) shows a low signal level 801 on the left side of the plot and a high signal 802 on the right side of the plot. Plot 810 (Y axis position) also shows a low signal level 811 to the left side of the plot and a high signal 812 on the right side of the plot. Horizontal dashed lines 803 and 813 indicate the mean (average) signal level between the high and low levels. The location of the intersection between the horizontal dashed line and the signal determine the edge of the substrate in scan coordinates. For example, in plot 800, the intersection of line 803 with detector signal, when followed by vertical line 804, indicates an X coordinate of approximately 149.6 mm. Similarly, in plot 810, the intersection of line 813 with detector signal, when followed by vertical line 814, indicates a Y coordinate of approximately 7.8 mm. For this example a work piece periphery location [149.6, 7.8] mm is obtained.

Instead of using the intersection of the signal with the mean of the low and high signal levels during the transition to detect the substrate edge, alternative methods can be used, such as finding the point of steepest slope during the transition. Many other methods of defining the transition point of a signal from low to a high level will be familiar to those skilled in the art.

Figure 8B:
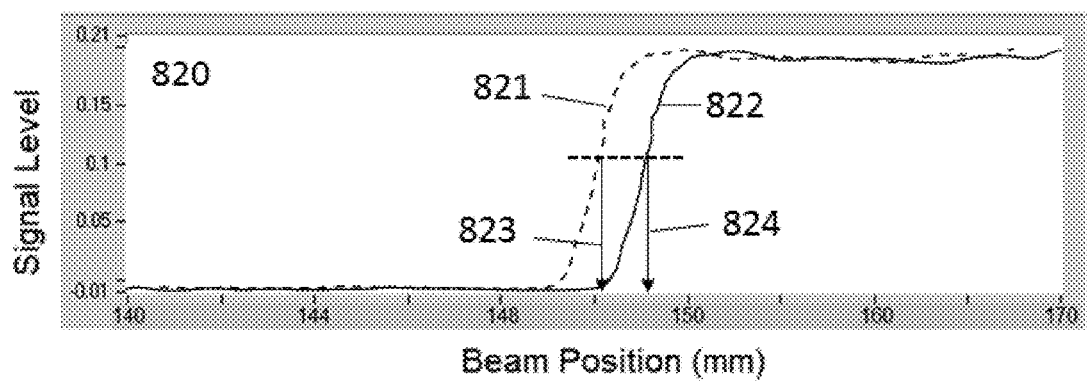
FIG. 8b shows representative signals obtained by a retroreflector detector when a probe beam is scanned across the edge of an object, said signals obtained in a first and a second scan direction.

A problem is encountered when detecting retroreflected signals obtained when scanning object edges or fiducials as described herein and depicted in FIG. 8a. With reference to FIG. 8b, plot 820 shows representative signals obtained from a retroreflected beam scanning over an object boundary. Trace 821 is a representative signal obtained when the beam traverses the edge on an object along a trajectory in a first direction, for example from an object surface towards a retroreflective surface. Trace 822 is a representative signal obtained when scanning said object along the identical trajectory, but in a second direction, for example from a retroreflective surface towards an object surface. It is seen that the object edge location 823, obtained when the beam travels from the object surface to the retroreflector surface, differs from the edge location 824, obtained when the beam travels from the retroreflector surface to the object surface.

Those skilled in the art will recognize the apparent shift in the measured edge location, as a function of scan direction, as common to many scan control and data sampling applications. For example, delays in the beam scan controls, electronics, optical, or mechanical components of the means for beam scanning can cause time delays between the commanded, measured and actual beam deflection position. In addition, signal delays in the retroreflector photodetector, signal amplifier, and data sampling circuits can cause additional time delays of the signal. The result of these delays is generally a constant time delay between commanded (or even measured) beam position and the detected retroreflector signal. When scanning an edge or fiducial at constant velocity, for example, this time delay is manifested as a generally constant edge position shift as depicted in FIG. 8b, for a given trajectory and scan velocity.

Those skilled in the art will appreciate many ways to correct for this so-called dynamic position detection error. For example, when detecting an object ficucial, two scans could be utilized, sequentially obtaining signals 821 and 822 shown in FIG. 8b. Then the average of positions 823 and 824 can be utilized as the corrected edge location. Alternatively, half of the offset between positions 823 and 824 shown in FIG. 8b can be stored by the scan control circuits or control computer and added to edge positions obtained from single scans in a first direction, or subtracted from edge positions obtained from single scans in a second direction, said first and second directions representing identical trajectories but disposed in opposite directions. Alternatively, compensating controls or electronics could be utilized in the beam deflection means, and/or in the signal detection means, in order to eliminate or reduce the time delay to acceptable levels.

Figure 9:
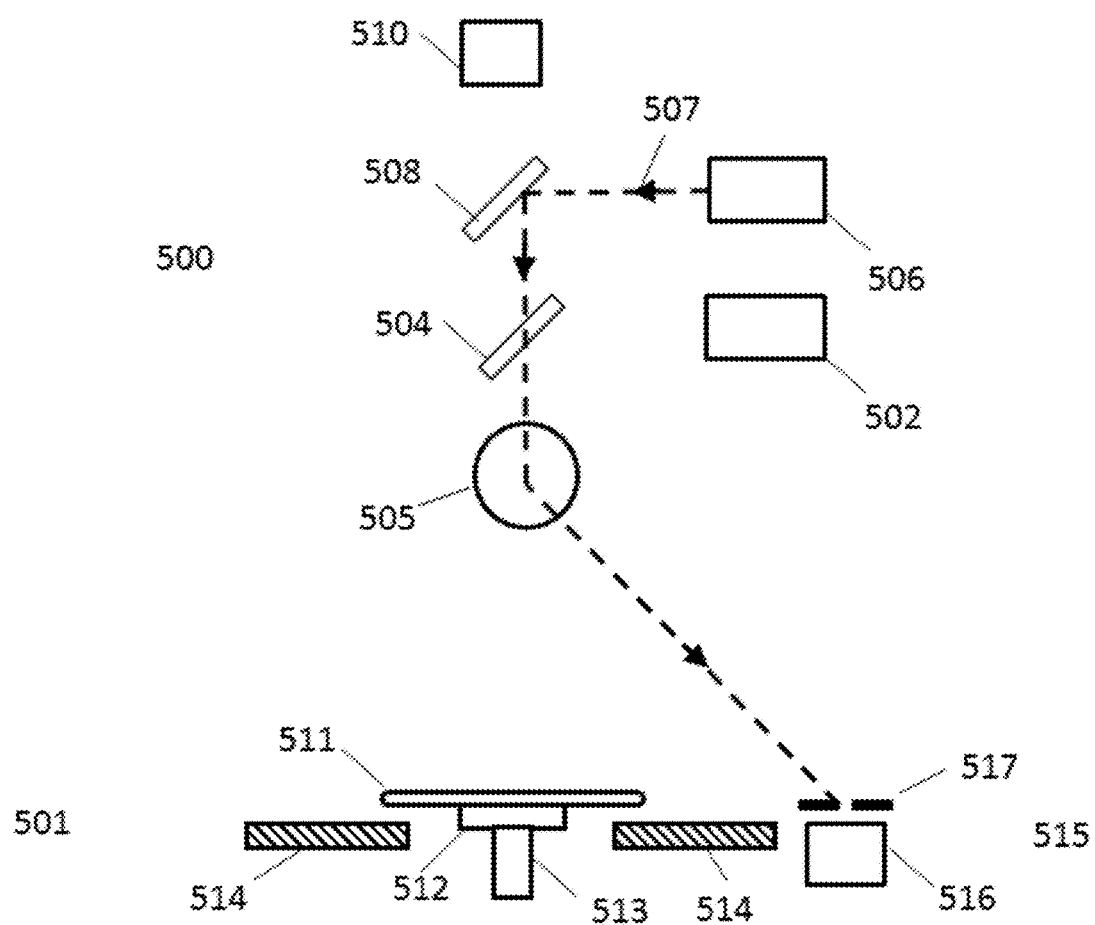
FIG. 9 shows a beam position sensor placed in the object plane, outside the retroreflective area surrounding the object, but within the reach of the beam scanning mechanism, being impinged upon by a probe beam.
Figure 10:
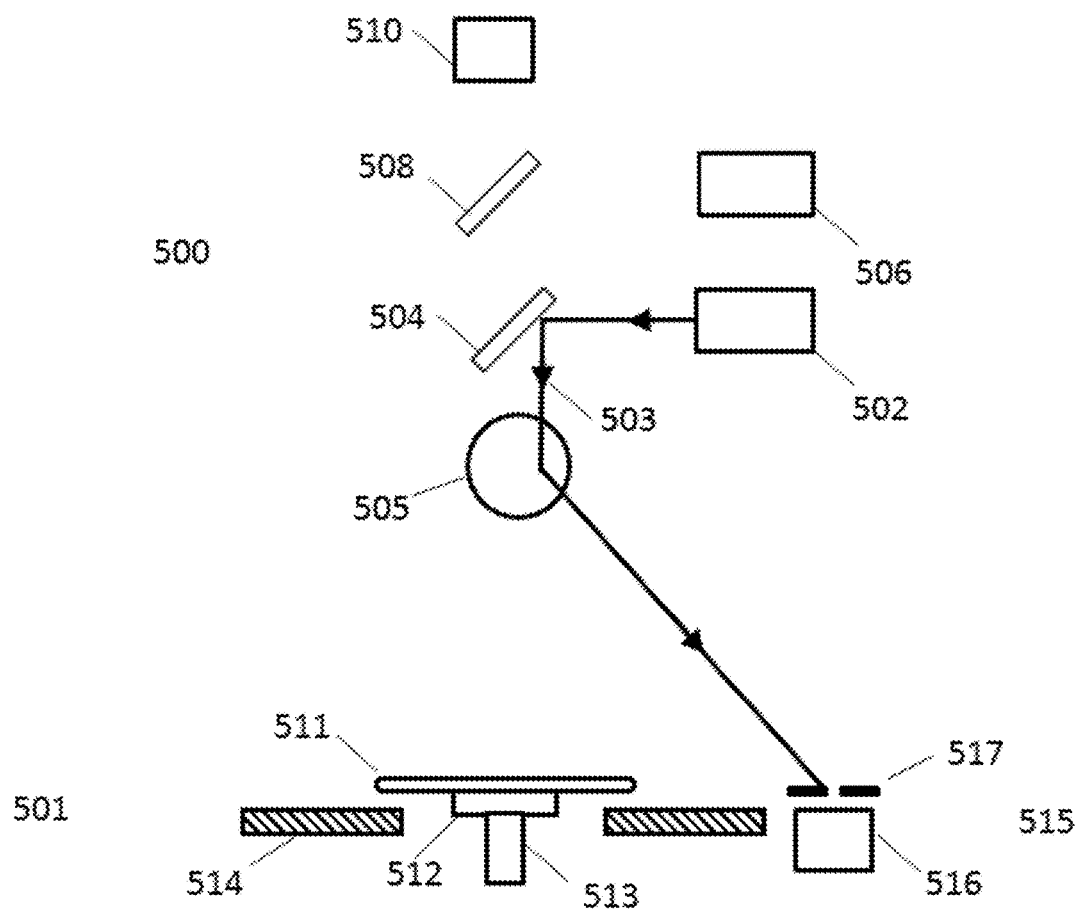
FIG. 10 shows a beam position sensor placed in the object plane, outside the retroreflective area surrounding the object, but within the reach of the beam scanning mechanism, being impinged upon by a process beam.

Knowledge of the lateral offset between the probe beam and the process beam is required in order to accurately place the process beam on the work piece. With reference to FIGS. 9 and 10, the process of measuring the offset between the probe beam and the process beam is disclosed. In FIG. 9 is shown the apparatus of FIG. 5 but configured so that only probe beam 507 is energized. FIG. 10 shows the apparatus of FIG. 9 but configured so that only process beam 503 is energized. Beam steering device 505 is first controlled to send probe beam 507 to beam position detector 515 where its position is detected as described below. After the position of the probe beam is determined, beam steering device 505 is then controlled to send process beam 503 to beam position detector 515 where its position is detected, as described below.

In one embodiment, beam position detector 515 is comprised of photodetector 516 and pinhole 517. Pinhole 517 is selected so that it is small compared to the size of the probe beam and the size of the process beam. For example, if the probe beam diameter is 1 mm and the process beam diameter is 2 mm, a pinhole diameter of 0.1 mm or 0.2 mm may be selected. Photodetector 516 is chosen so that it is sensitive to both the process and probe beams.

Figure 11A:
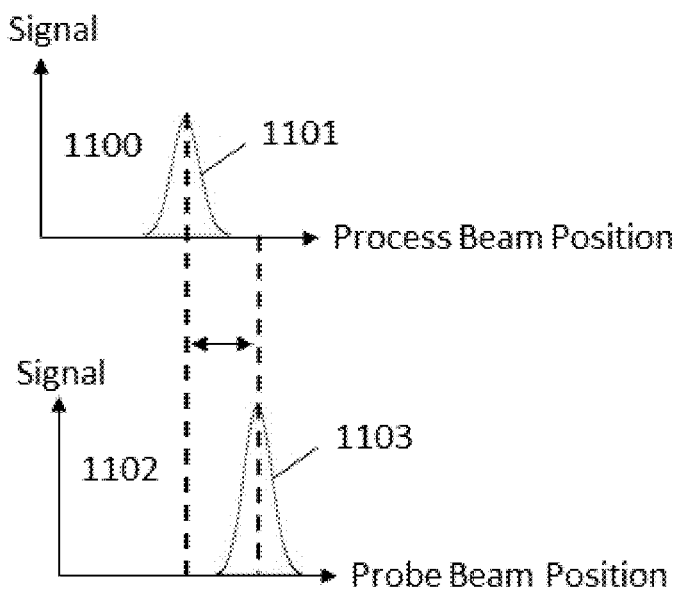
FIG. 11a shows representative signals observed in the sensors indicated in FIGS. 9 and 10, showing a positional offset between a process beam and probe beam, said offset which can be accurately determined.
Figure 11B:
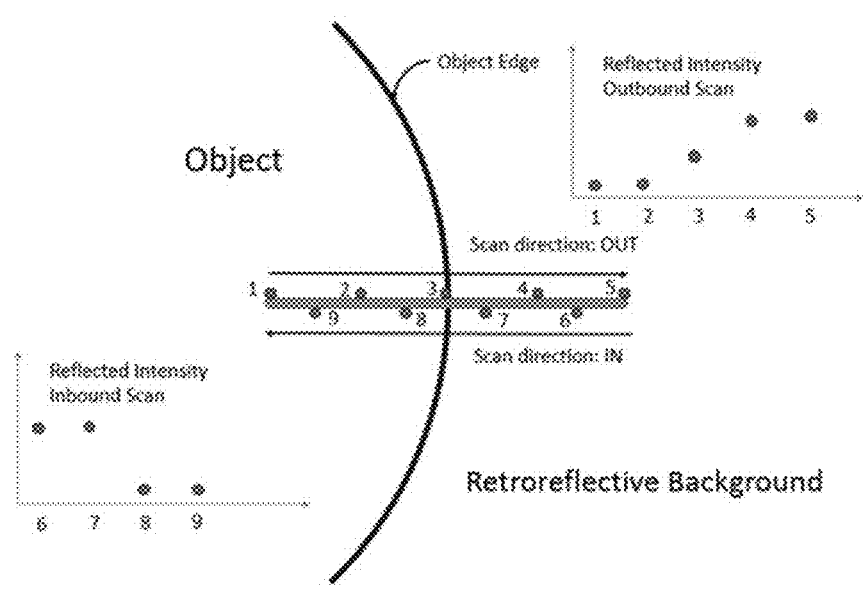
FIG. 11b shows representative signals in a retroreflective detector from a probe beam edge detection scan of an object.

FIG. 11a shows plots of representative signals from beam position detector 515 vs. beam position as process and probe beams are alternatively scanned to traverse the face of beam position detector 515. In FIG. 11a, "Beam Position" can indicate, for example, the X scan axis or the Y scan axis. Plot 1100 shows detector signal 1101 vs. process beam position (while probe beam is off), whilst plot 1102 shows detector signal 1103 vs. probe beam position (while process beam is off). The vertical dashed lines indicate the centroid positions of both beams. The difference between the measured centroid positions of the process and probe beams on the detector indicates the offset between the process beam and probe beam and can be used to correct the location of the process beam from the known location offset of the probe beam during work piece processing.

In FIGS. 9 and 10, beam position detector 515 is comprised of a photodetector masked by a pinhole. However, those skilled in the art will contemplate many other ways to detect a beam's position. For example, this includes scanning a beam over a detector with a small active area. This also includes use of two detectors, each masked by a slit, where the slits are oriented 90 degrees with respect to each other. This also includes use of a stationary beam on a position sensing detector such as a position-sensitive detector (PSD), a quadrant detector (quad cell), or a CCD or CMOS image sensor. This also includes use of scanning a beam over a small fluorescent target, or a fluorescent target equipped with fiducial markings, and recording the fluoresced signal with a photodetector or camera.

A probe beam is co-aligned to a process beam so the positioning of the probe beam relative to the process beam must be determined. Beam deflection means used to scan the process beam across the object are also capable of scanning the probe beam. The following description assumes that only the probe beam is used to determine the edge of the object. However, both probe beam and process beams may be concurrently energized, or may be alternating.

When the beam deflection means positions the probe beam such that it is on the object near the object edge (for example, near a wafer edge), but away from the edge itself by a significant multiple of the beam diameter, no part of the probe beam will be reflected towards the detector. When the probe beam is scanned towards the object edge, part of the beam will still be on the object and thus not contributing any signal at the detector. Another part of the beam, however, will pass the object edge, partially illuminating the adjacent retroreflective material, and return a signal to the detector, which can be readily observed. Continued scanning in the outward direction results in the entire beam illuminating the retroreflective material resulting in the peak signal in the detector.

Whenever the probe beam is incident on the object, very little light is reflected back and is observed with the detector. Whenever the probe beam illuminates the retroreflective material, however, a significant increase in the signal strength is observed at the detector. The transition from non-reflecting object to retroreflective background is readily detectable and shown in concept in FIG. 11b as a scan which crosses from incident on the object to illuminating the retroreflective surface noting the detector signal in beam positions (1) through (5) for the outbound scan, and in beam positions (6) through (9) in the returning inbound scan.

Figure 12:
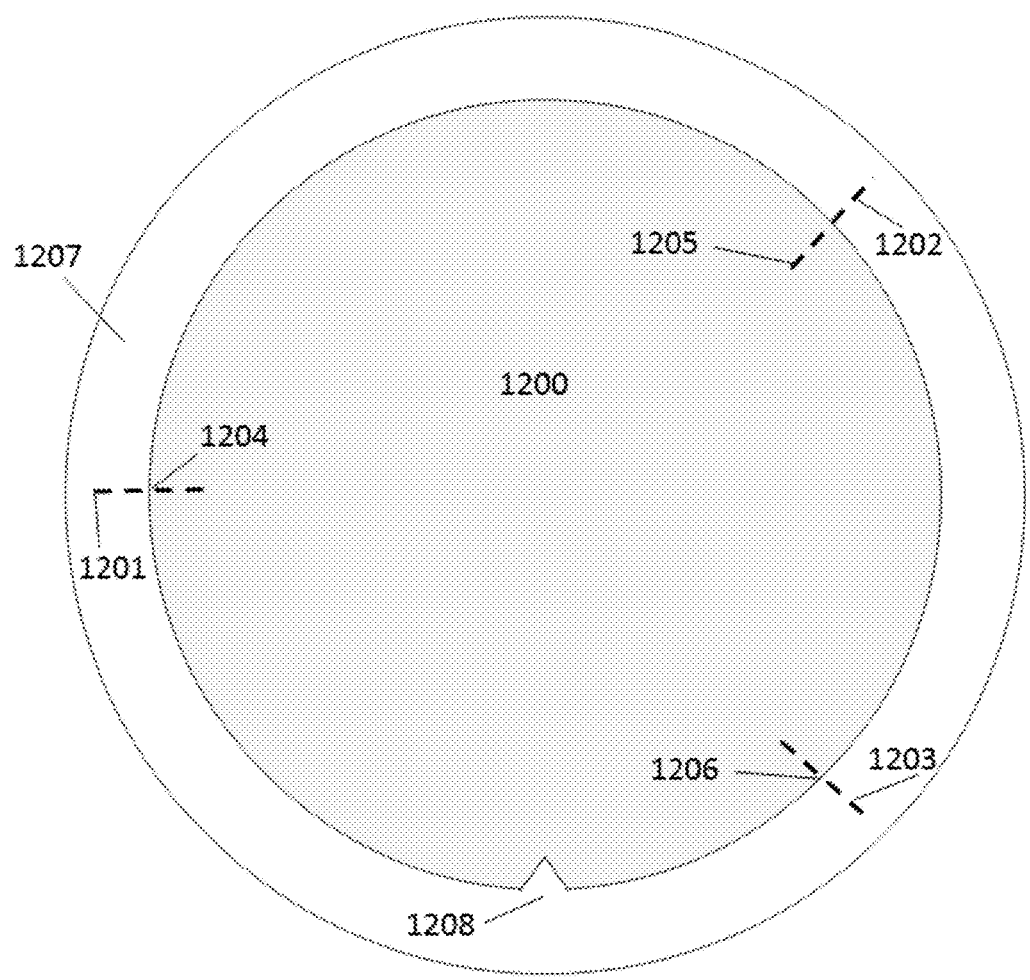
FIG. 12 shows an example of using three edge scans of a circular object of known dimensions with a probe beam to accurately determine the object's center location.

In one embodiment of the invention, accurate detection and location of multiple points on the periphery of a substrate can be used to determine the position of the substrate, such as the center location. For example, for the case of a round substrate such as a silicon wafer, knowledge of the location of three or more points on the periphery of the wafer can be used to locate the wafer center. For example, with reference to FIG. 12, consider a wafer 1200 which has been scanned with three scans disposed at angles of approximately 120 degrees around the periphery, as indicated by dashed lines 1201, 1202, and 1203. Note that the scans are chosen so as not to traverse notch 1208, which would cause an error in the substrate's measured center location. Surrounding wafer 1200 is disposed retroreflective collar 1207. Analysis of retroreflected signals from these scans determines periphery location 1204 yielding point $[x_1, y_1]$, periphery location 1205 yielding point $[x_2, y_2]$, and periphery location 1206 yielding point $[x_3, y_3]$. Then the quantity T given by equation $$T = \sum_{n=1}^{3} [(x_0 - x_n)^2 + (y_0 - y_n)^2]$$

can be minimized with respect to $x_0$ and $y_0$ using the well-known principle of least-squares minimization, yielding an estimate of wafer center position $[x_0, y_0]$. More than three points on the periphery can also be utilized for improved accuracy. Those skilled in the art would be familiar with other methods to determine a substrate's center from a plurality of periphery measurements.

In another embodiment of the invention, accurate determination and correction of the scale of beam deflection in distinct directions can be performed. For example, a work piece may be scanned with a probe beam to determine its lateral dimension along particular directions. If the substrate's dimensions along particular directions are known, the deviation of the measured substrate dimension along a particular direction with respect to the known dimension along that direction can be used to determine the scan scale along that direction.

Figure 13:
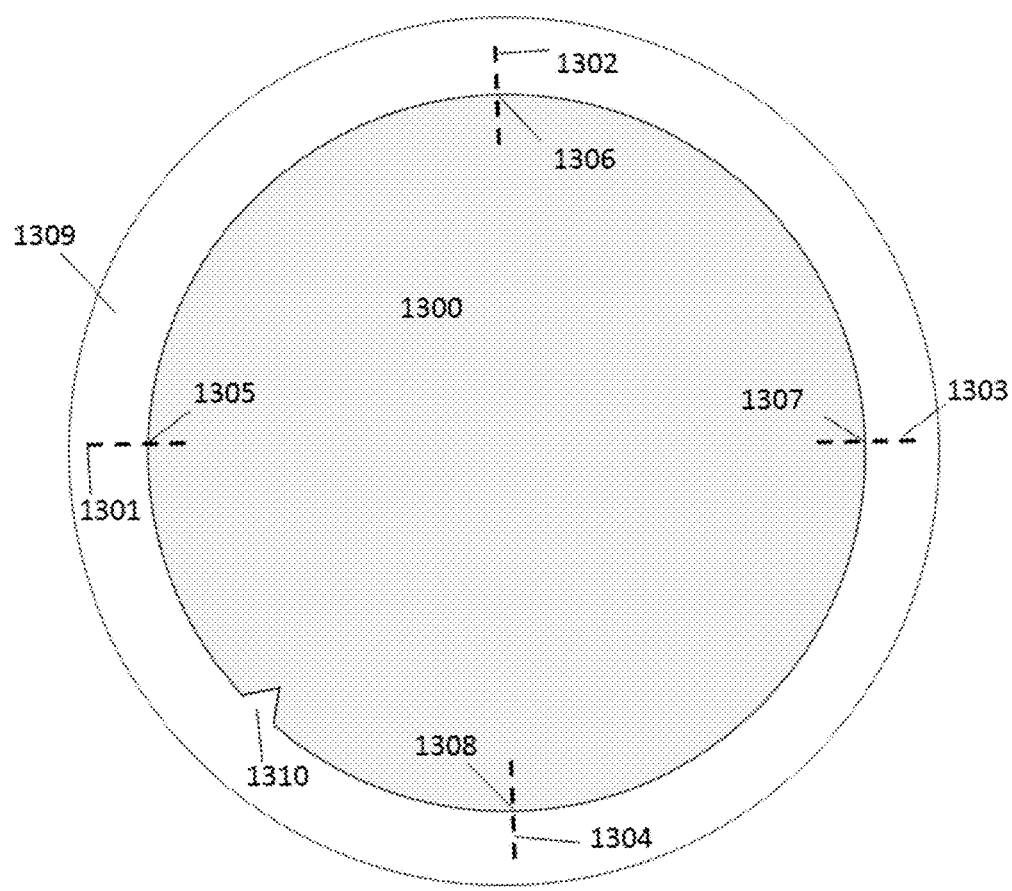
FIG. 13 shows an example of using four edge scans of a circular object of known dimensions with a probe beam to accurately determine the X and Y scale factors of beam deflection.

For example, with reference to FIG. 13, a 300 mm-diameter silicon wafer is disposed and scanned by a probe beam at four periphery locations. Note that the scans are chosen so as not to traverse notch 1310, which would cause an error in the substrate's measured dimensions. Surrounding wafer 1300 is disposed retroreflective collar 1309. Scan 1301 performed along the X axis obtains wafer periphery location 1305 yielding point $[x_1, y_1]$. Scan 1303 performed along the X axis obtains wafer periphery location 1307 yielding point $[x_2, y_2]$. Scan 1302 performed along the Y axis obtains wafer periphery location 1306 yielding point $[x_3, y_3]$. Scan 1304 performed along the Y axis obtains wafer periphery location 1308 yielding point $[x_4, y_4]$. The quantity $S_x=(x_2-x_1)/300$ indicates the scale correction factor for the X axis, whilst the quantity $S_y=(y_3-y_4)/300$ indicates the scale correction factor for the Y axis. Similarly, scale factors for other directions can be obtained. Scale factors can be used to correct beam deflection controls in particular directions in order to improve scan accuracy. For example, for the case of galvanometer scan devices, said measured scan factors can be used to correct the scan angle vs. input voltage gain factor for this device.

In addition to the accurate determination of substrate center, it is frequently important to determine substrate orientations such as rotation. For example, the semiconductor industry had utilized smaller silicon wafer sizes in round format with a short, flat edge (so-called wafer flat) to determine substrate orientation, however, starting with 300 mm wafer size, wafer flats were replaced by a small triangular notch (also called wafer notch), which significantly increased the number of edge die available and contributing to higher yield. For many processes, the orientation of this notch is important to know. In other industrial processes, the orientation of work pieces can be obtained by probing other types of fiducial artifacts on the periphery or interior of work pieces.

Figure 14:
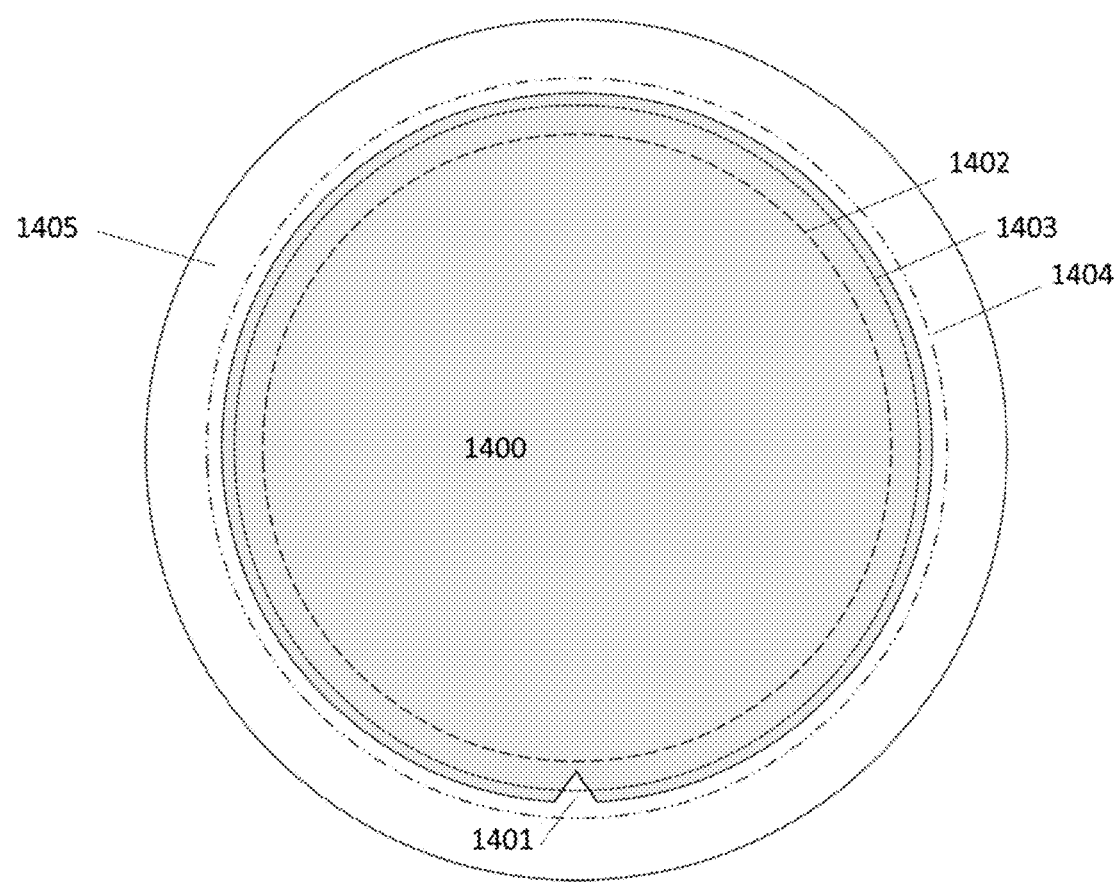
FIG. 14 shows three representative concentric circular scans of a probe beam on a circular substrate used to demonstrate determining the angular position of the wafer notch.

In another embodiment of the invention, a method for determining the location of a wafer notch using the invention is disclosed. This method requires knowledge of the physical shape and dimension of the work piece. For example, in the semiconductor industry, the diameter and roundness of wafer dimensions are well known. Using the procedures disclosed herein, the location of the wafer notch can be obtained. With reference to FIG. 14, a silicon wafer 1400 is disposed with fiducial notch 1401. Representative probe beam circular scan trajectories 1402, 1403 and 1404 are shown, wherein scan 1402 is well inside the wafer boundary, scan 1403 is near the wafer boundary so that it transits wafer notch 1401, and scan 1404 is well outside the wafer boundary but still on retroreflector 1405.

Figure 15:
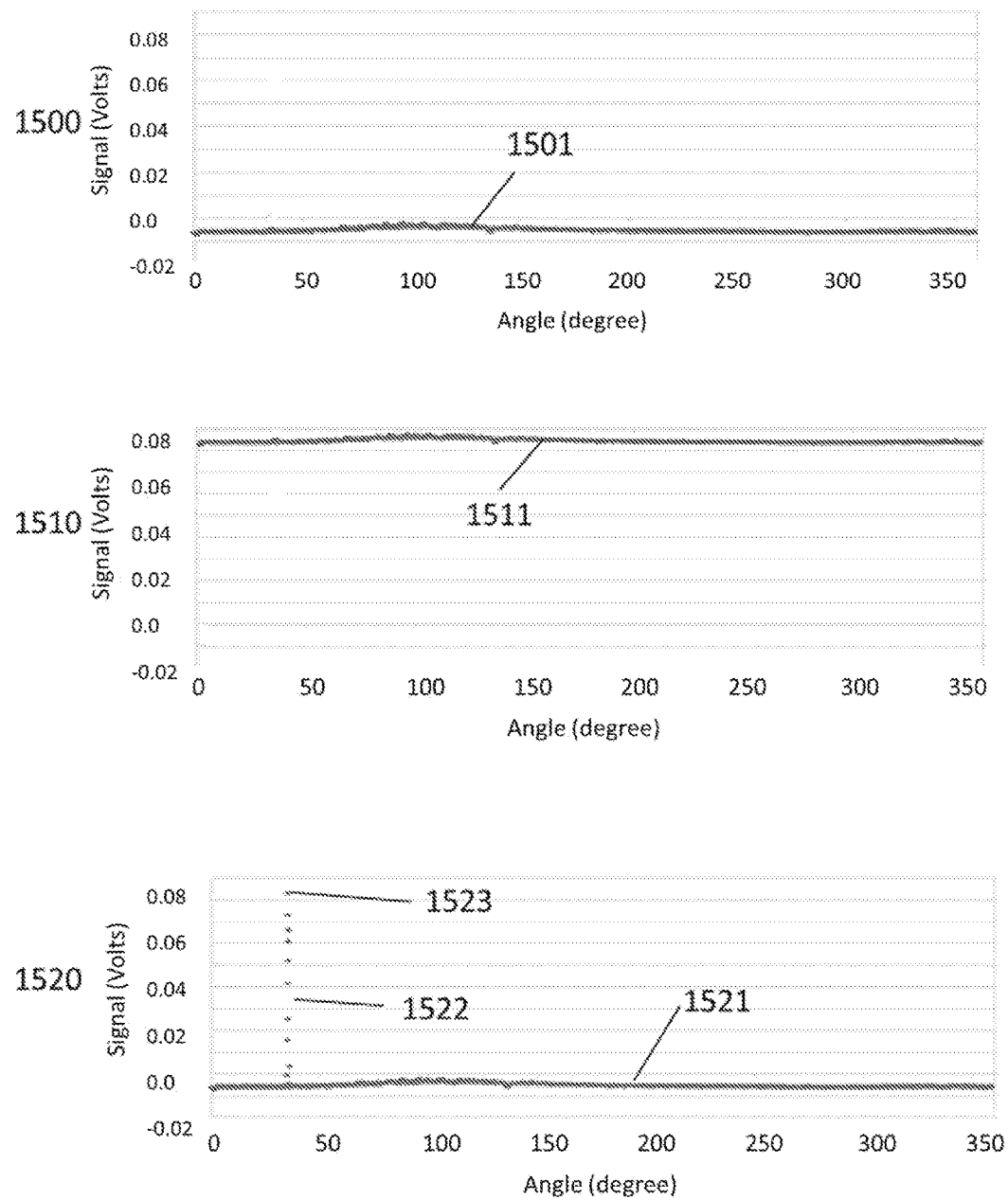
FIG. 15 shows representative signals detected in by retroreflected beam detector as a probe beam is scanned along the traces indicated in FIG. 14.

In FIG. 14 scan 1402 is shown, where the radius of the scan is sufficiently small so that it does not traverse notch 1401. Plot 1500 of FIG. 15 shows representative retroreflection signal 1501 obtained from scan 1402. In this case a low signal level vs. scan angle (0-360 degrees) is obtained, indicating that the probe beam scan is completely on the wafer surface. Scan 1404 is also shown, in this case the circular trajectory has a radius sufficiently large so that it is completely outside of the wafer but is still within retroreflector 1405. Plot 1510 of FIG. 15 shows a representative retroreflection signal 1511 obtained from scan 1404. In this case a high signal level vs. scan angle is obtained, indicating that the scan is completely on the retroreflector surface. Scan 1403 is also shown, where in this case the scan is on the wafer but close to the wafer edge. Plot 1520 of FIG. 15 shows a representative retroreflection signal 1521 obtained from scan 1403. In this case a low signal level vs. scan angle is obtained, except for a rapid transition to high signal level 1523 followed by rapid decrease to a low level. The brief low/high/low signal transition 1522 corresponds to the beam transiting notch 1401 thus obtaining the substrate's angular orientation in beam scan coordinates.

Figure 16:
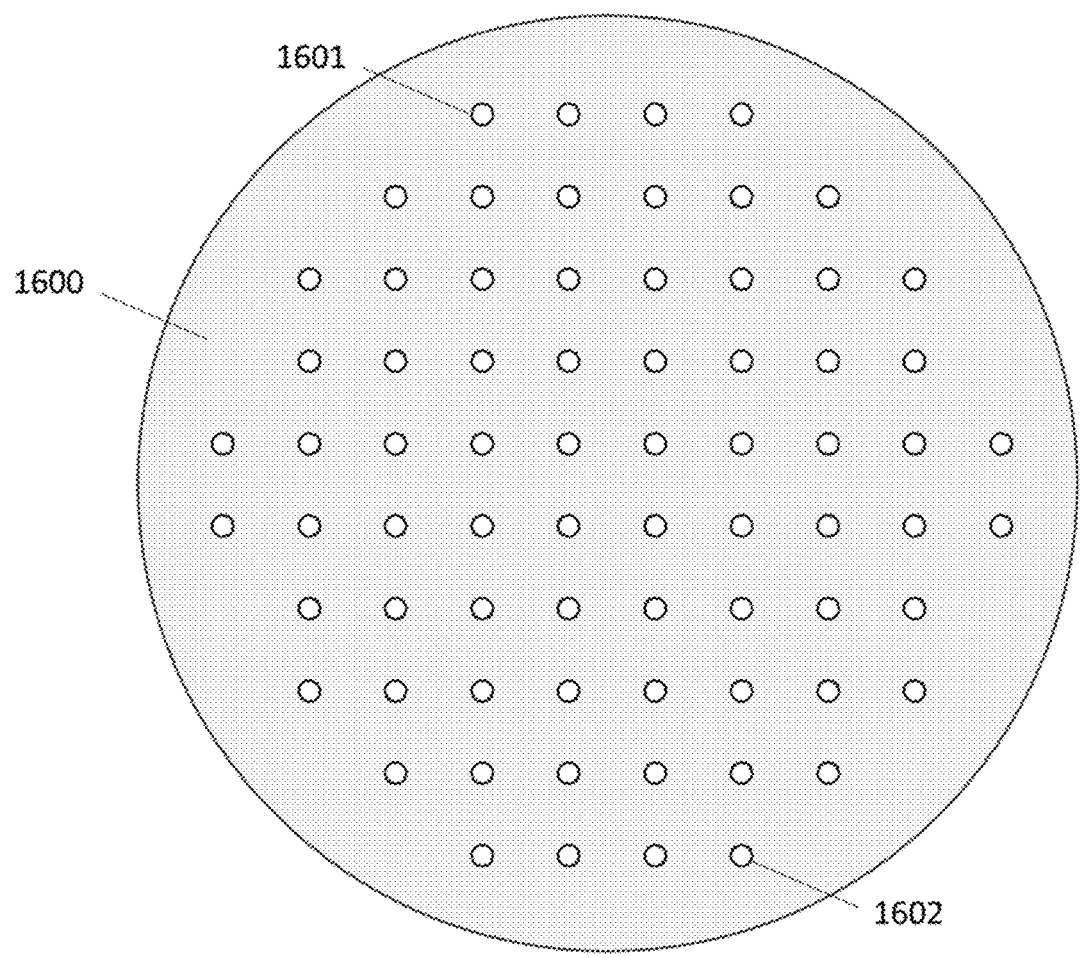
FIG. 16 shows a top view of a fiducial target substrate disposed with an array of fiducial retroreflector elements whose positions are known with good accuracy.

In yet another embodiment of the invention, retroreflective fiducials are used to generate highly accurate linearity correction factors for scan fields. With reference to FIG. 16, target substrate 1600 is disposed with a plurality of retroreflective fiducial elements 1601 to 1602, where fiducial 1601 represents a first fiducial and 1602 represents a last fiducial. In the figure fiducials 1601 to 1602 are represented by small circles, but other shapes, such as squares or polygons, may be used. In the figure a rectangular lattice of fiducial elements is shown. However, many other distributions of elements may be used, such as a radial set of elements.

It is preferred to scan a plurality of fiducials using a probe beam in order to locate their centers. The precision of location of each fiducial by the probe beam is improved if the size of said fiducials is smaller than the size of the probe beam. For example, for a probe beam diameter of 2 mm the fiducial elements may be 1 mm or 0.5 mm. Target substrate 1600 is typically used as a tool, sometimes called a substrate surrogate, to help linearize the scan coordinates using a probe beam. Once this process is completed, the product substrates are substituted for the target substrate and are subsequently exposed with a process beam.

Figure 17:
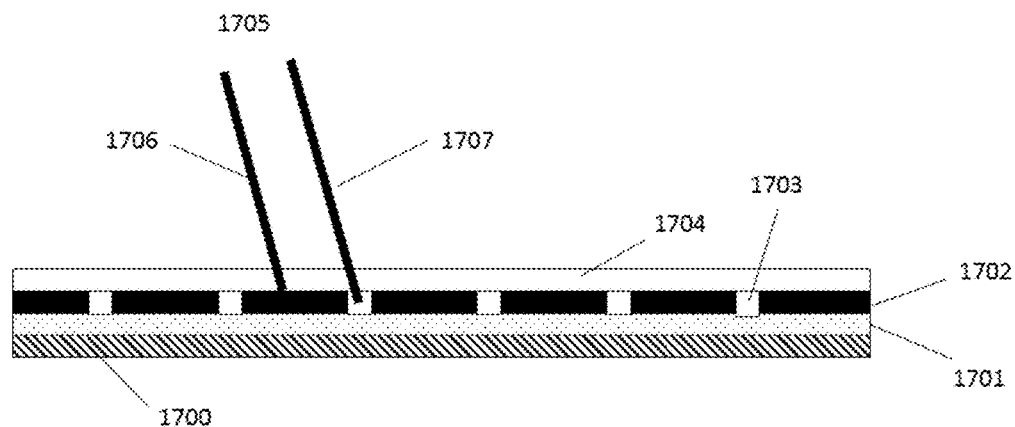
FIG. 17 shows a cross section of a fiducial target substrate incorporating a mask layer above a retroreflector layer.

FIG. 17 depicts a cross section of target substrate 1600 shown in FIG. 16. In one embodiment, four layers are used in its construction. Support layer 1700 is first disposed to provide a flat substrate to support retroreflective layer 1701. Masking layer 1702 exposes apertures 1703 to the probe beam. Apertures 1703 correspond to fiducials 1601 to 1602 shown in FIG. 16. Covering masking layer 1702 is optional protection layer 1704 which is transparent to the probe beam and optionally opaque to the process beam, for example a layer of glass or fused silica. It is important that apertures 1703 be precisely placed at known locations across substrate 1700. Many methods of producing an array of precisely located apertures in a layer will be familiar to these skilled in the art. For example, apertures 1703 may be laser drilled into a thin sheet to metal. Alternatively, apertures may be photo-lithographically patterned and chemically etched into a thin metal sheet (also called photo engraving). Alternatively, apertures may be photo-lithographically patterned in a thin metal layer on a glass substrate (also called a reticle) using techniques used to produce photo masks for semiconductor processing. Precision target arrays and reticles are available from many vendors.

The process of measuring the center of a fiducial element is described. Substrate 1700 is scanned by probe beam 1705. Probe beam 1705 is shown at position 1706 where the beam impinges on masking layer 1702 away from apertures 1703. In this case no retroreflector signal is produced. Probe beam 1705 is also shown at position 1707 at a later time where the beam impinges on masking layer 1702 precisely on an aperture 1703. In this case a large retroreflective signal is produced.

Figure 18:
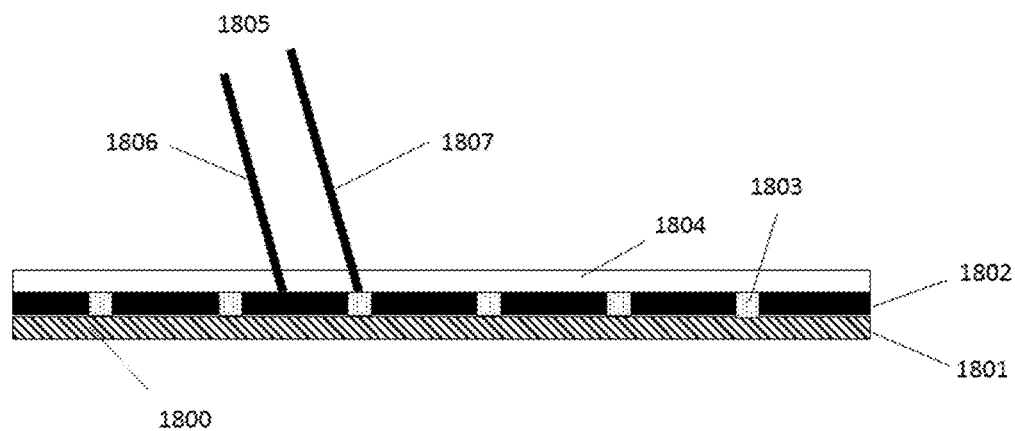
FIG. 18 shows a cross section of a fiducial target substrate incorporating a retroreflector layer embedded in a mask layer.

FIG. 18 depicts an alternative embodiment where instead of using a retroreflective layer 1701 as shown in FIG. 17, retroreflective material 1803 is inlaid into apertures in masking layer 1802. While the aperture is shown as a circular hole in FIG. 18, it may be in any shape, including, but not limited to, a slit, cross, box or circle. Covering masking layer 1802 is optional protection layer 1804 which is transparent to the probe beam and optionally opaque to the process beam, for example a layer of glass or fused silica. The process of measuring the center of a fiducial element is similar to that in FIG. 17. Substrate 1800 is scanned by probe beam 1805. Probe beam 1805 is shown at position 1806 where the beam impinges on masking layer 1802 away from apertures 1803. In this case no retroreflector signal is produced. Probe beam 1805 is also shown at position 1807 at a later time where the beam impinges on masking layer 1802 precisely on inlaid retroreflective material 1803. In this case a large retroreflective signal is produced.

Figure 19:
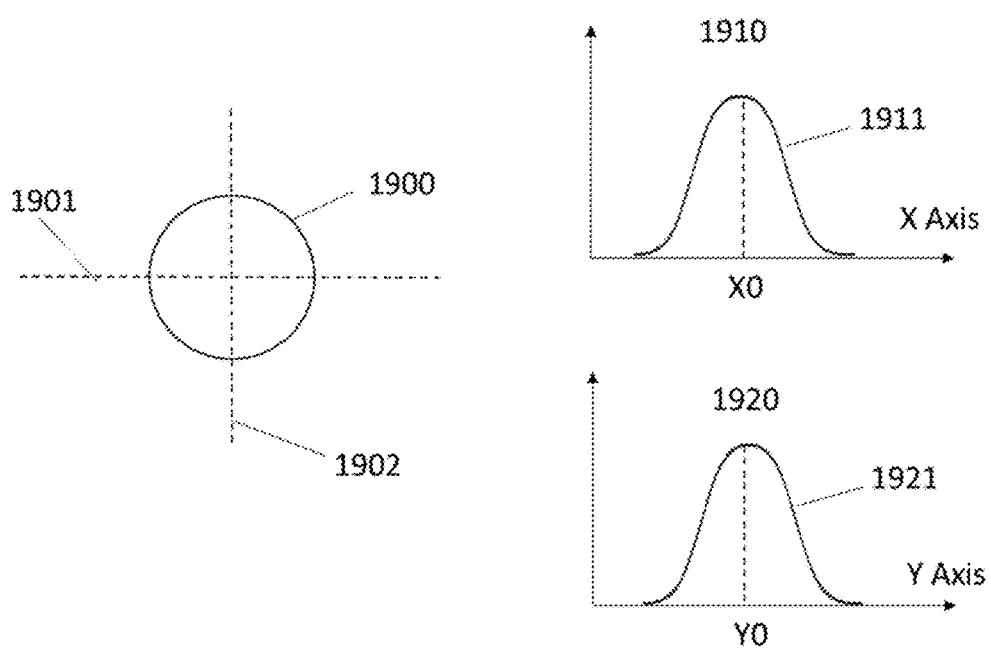
FIG. 19 shows representative retroreflected signals along an X and a Y axis observed from a scanning a single fiducial element of FIG. 16 with a probe beam.

FIG. 19 shows details of scanning a single fiducial element. Fiducial element 1900, comprised with an interior of retroreflective material, is scanned in an X direction 1901 and subsequently scanned in a Y direction 1902. Other scan schemes can also be used. Representative plot 1910 shows retroreflector signal 1911 vs. X axis probe beam position, whilst representative plot 1920 shows retroreflector signal 1921 vs. Y axis probe beam position. Those skilled in the art can analyze these signals to determine the fiducial element center position [X0, Y0] in scan coordinates. For example, the axis position corresponding to the peak values of each scan can be used. Alternatively, the centroid of the signal from each scan can be used.

The procedure described and depicted in FIG. 19 can be performed sequentially on a plurality of fiducial points 1601 to 1602 shown in FIG. 16, obtaining a set of measured fiducial element centers $M_i=[X_i, Y_i]$, where index i=1, 2, 3 ..., n, and n is the number of fiducial elements scanned. The known centers of the fiducial elements are given by $R_i=[X_i, Y_i]$. The difference between the measured and known fiducial centers constitutes the scan coordinate error as a function of X and Y position across the substrate, and is given by vector quantity $E_i=M_i-R_i$. It is desired to use this set of errors $E_i(X_i, =[g_i, h_i]$ to correct the scan coordinate reference frame in order to improve the position of a process beam across the work piece.

Those skilled in the art will understand that many ways can be used to correct scan coordinates using a set of measured scan errors $E_i$. For example, the well-known least squares minimization technique can be used to obtain the coefficients of correction polynomials defined over the area of a substrate.

For example, consider a desired position [x, y] to deflect a beam on a substrate. We define offset correction functions $G_x(x, y)$ and $G_y(x, y)$ which, when added to desired positions x and y and sent to beam scanning means, will result in the beam being deflected to the desired location with reduced error. For example, we may define correction functions as a linear sum of basis functions $f_j(x, y)$ such that $$G_x(x, y) = \sum_{j=1}^{m} c_j f_j(x, y)$$

$$G_y(x, y) = \sum_{i=1}^{m} d_j f_j(x, y)$$

For example, the functions $f_j(x, y)$ may be comprised of terms like $x$, $y$, $x^2$, $y^2$, $xy$, $x^2y$, etc. Alternatively, they may be comprised of trigonometric functions like $\cos(x)$, $\sin(x^2y)$, or any other function of x and y. Alternatively they may be comprised of functions of so-called r-θ or polar coordinates, were $r^2=x^2+y^2$ and $\tan(\theta)=y/x$. Those skilled in the art will understand many other ways to form the basis functions.

Then the quantities $T_x$ and $T_y$ can be minimized, for example by use of the well-known least squares minimization method, to obtain the coefficients $c_j$ and $d_j$, viz.

$$T_x = \sum_{i=1}^{n} (G_x(x_i, y_i) - g_i)^2 = \sum_{i=1}^{n} \left( \sum_{j=1}^{m} c_j f_j(x_i, y_i) - g_i \right)^2$$

$$T_y = \sum_{i=1}^{n} (G_y(x_i, y_i) - h_i)^2 = \sum_{i=1}^{n} \left( \sum_{j=1}^{m} d_j f_j(x_i, y_i) - h_i \right)^2$$

Those skilled in the art will be familiar with the least-squares method and corresponding well known algorithms which can determine the coefficients $c_j$ and $d_j$. Other means of obtaining the coefficients will be known to those familiar with the art, for example the maximum likelihood method. Computer algorithms for obtaining the coefficients $c_j$ and $d_j$ using least squares and other methods are available from many vendors, for example, the Mathworks, Inc.

Those skilled in the art will understand that there can be many variations made to the techniques and apparatus taught herein while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An apparatus for determining the position of an object fiducial comprising:
   a probe beam generation unit that generates a probe beam;
   a beam steering device;
   a substrate, having the object fiducial, disposed on a substrate holder;
   retroreflective material disposed under, around, adjacent to and/or within the object fiducial; and
   a retroreflective beam detector;
   wherein the retroreflective material is different than the substrate;
   the retroreflective beam detector is positioned to detect a probe beam that has been retroreflected by the retroreflective material and
   the retroreflective material reflects the probe beam towards the retroreflective beam detector with a higher intensity than the substrate reflects the probe beam towards the retroreflective beam detector.

2. The apparatus of claim 1 further comprising:
   a first beam splitter disposed to reflect the probe beam toward the beam steering device.

3. The apparatus of claim 2 wherein the retroreflected probe beam passes through the first beam splitter before being detected by the retroreflective beam detector.

4. The apparatus of claim 2 wherein the retroreflected probe beam does not pass through the first beam splitter before being detected by the retroreflective beam detector.

5. The apparatus of claim 4 wherein the retroreflective material is protected from exposure to the process beam by a material that is transparent to the wavelength of the probe beam, but opaque to the wavelength of the process beam.

6. The apparatus of claim 1 further comprising:
   a process beam generation unit that generates a process beam; and
   a second beam splitter disposed to reflect the process beam toward the beam steering device.

7. The apparatus of claim 6 wherein the first beam splitter and second beam splitter are configured such that the probe beam and the process beam are substantially co-aligned when entering the beam steering device.

8. The apparatus of claim 7 wherein the probe beam and the process beam are nearly superimposed.

9. The apparatus of claim 6 wherein the probe beam and the process beam are substantially co-aligned such that, when the beam steering device steers the probe beam to a location on the substrate or retroreflective material, it will also steer the process beam to the same location with, at most, a small offset.

10. The apparatus of claim 6 further comprising a position sensing detector that detects an offset between the position of the probe beam and the position of the process beam.

11. The apparatus of claim 10 wherein the position sensing detector comprises a photodetector.

12. The apparatus of claim 11 wherein the position sensing detector further comprises a pinhole that is small compared to the size of the probe beam and the process beam.

13. The apparatus of claim 1 wherein the object fiducial is an edge, notch, corner, or other geometric artifact positioned on the exterior boundary of the substrate.

14. The apparatus of claim 1 wherein the object fiducial is a hole, slit, cross, box, circle, ring, or other geometric artifact embedded in the interior of the substrate.

15. The apparatus of claim 1 wherein the retroreflective material is positioned to completely surround the object fiducial.

16. The apparatus of claim 1 wherein the beam steering device comprises a scanning mirror, a scanning stage, a galvanometer mirror, an electro-optic beam deflector, an acousto-optic beam deflector, or a micro-mechanical scanning device.

17. The apparatus of claim 1 wherein the position of at least one object fiducial as detected by the retroreflective beam detector is used to correct a scan geometry of the process beam on the substrate.

18. A method of determining the position of an object fiducial in a substrate comprising the steps of:
generating a probe beam;
steering the probe beam across the substrate at least in the vicinity of the object fiducial;
detecting the probe beam that has been retroreflected by retroreflective material disposed under, around, adjacent to and/or within the object fiducial, wherein the retroreflective material is different than the substrate, and the retroreflective material reflects the probe beam towards its source with a higher intensity than the substrate reflects the probe beam towards its source; and
determining the location of the object fiducial based on the retroreflected probe beam.

19. The method of claim 18 further comprising the steps of:
reflecting the probe beam by a first beam splitter prior to steering the probe beam.

20. The method of claim 19 wherein the retroreflected probe beam passes through the first beam splitter before being detected.

21. The method of claim 19 wherein the retroreflected probe beam does not pass through the first beam splitter before being detected.

22. The method of claim 18 further comprising the steps of:
generating a process beam;
reflecting the process beam by a second beam splitter; and
steering the process beam across the substrate.

23. The method of claim 22 wherein the probe beam and the process beam are substantially co-aligned.

24. The method of claim 23 wherein the probe beam and the process beam are nearly superimposed.

25. The method of claim 22 wherein the probe beam and the process beam are substantially co-aligned such that, when the probe beam is steered to a location, the process beam is steered to the same location with, at most, a small offset.

26. The method of claim 22 further comprising the step of detecting an offset between the position of the probe beam and the position of the process beam.

27. The method of claim 22 wherein the step of detecting is performed at least in part by a photodetector.

28. The method of claim 27 wherein the step of detecting is further performed at least in part by a pinhole that is small compared to the size of the probe beam and the process beam.

29. The method of claim 22 further comprising the step of protecting the retroreflective surface from exposure to the process using a material that is transparent to the wavelength of the probe beam, but opaque to the wavelength of the process beam.

30. The method of claim 18 wherein the object fiducial is an edge, notch, corner, or other geometric artifact positioned on the exterior boundary of the substrate.

31. The method of claim 18 wherein the object fiducial is a hole, slit, cross, box, circle, ring, or other geometric artifact embedded in the interior of the substrate.

32. The method of claim 18 wherein the retroreflective material is positioned to completely surround the object fiducial.

33. The method of claim 18 wherein the step of steering is performed by a scanning mirror, a scanning stage, a galvanometer mirror, an electro-optic beam deflector, an acousto-optic beam deflector, or a micro-mechanical scanning device.

34. The method of claim 18 further comprising the step of correcting a scan geometry of a process beam based on the determined location of the object fiducial.

* * * * *

UNITED STATES PATENT AND TRADEMARK OFFICE
CERTIFICATE OF CORRECTION

| | | |
|---|---|---|
| PATENT NO. | : 10,145,672 B2 | |
| APPLICATION NO. | : 15/414385 | |
| DATED | : December 4, 2018 | |
| INVENTOR(S) | : Schattenburg et al. | |

It is certified that error appears in the above-identified patent and that said Letters Patent is hereby corrected as shown below:

In the Claims

Column 20 Line 20, "process using" should read --process beam using--

Signed and Sealed this
Twenty-first Day of May, 2024

Katherine Kelly Vidal
*Director of the United States Patent and Trademark Office*